(12) United States Patent
Shiffert et al.

(10) Patent No.: US 10,304,074 B2
(45) Date of Patent: *May 28, 2019

(54) DEVICES, METHODS, AND COMPUTER-READABLE MEDIA FOR REDEMPTION HEADER FOR MERCHANT OFFERS

(71) Applicant: RetailMeNot, Inc., Austin, TX (US)

(72) Inventors: Nicholas James Shiffert, Austin, TX (US); Michael Paul Cravey, Austin, TX (US); Jagjit Signh Bath, Austin, TX (US)

(73) Assignee: RetailMeNot, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/219,649

(22) Filed: Dec. 13, 2018

(65) Prior Publication Data

US 2019/0122246 A1   Apr. 25, 2019

Related U.S. Application Data

(63) Continuation of application No. 15/944,469, filed on Apr. 3, 2018, which is a continuation of application (Continued)

(51) Int. Cl.
*H04L 29/08* (2006.01)
*G06Q 30/02* (2012.01)

(52) U.S. Cl.
CPC ......... *G06Q 30/0222* (2013.01); *G06Q 30/02* (2013.01); *G06Q 30/0225* (2013.01);
(Continued)

(58) Field of Classification Search
CPC ............... G06Q 30/02; G06Q 30/0222; G06Q 30/0242; G06Q 30/0269; G06Q 30/0267; H04L 67/02
See application file for complete search history.

(56) References Cited

U.S. PATENT DOCUMENTS 6,993,596 B2   1/2006  Hinton et al.
7,302,402 B2  11/2007  Callaghan et al.
(Continued)

FOREIGN PATENT DOCUMENTS

WO   2010094927 A   8/2010

OTHER PUBLICATIONS

Office Action for Related Canadian Application No. 2,876,007, dated Dec. 18, 2019, pp. 1 to 3.
(Continued)

*Primary Examiner* — Luis A Brown
*Assistant Examiner* — Robert C Johnson
(74) *Attorney, Agent, or Firm* — Pillsbury Winthrop Shaw Pittman LLP

(57) ABSTRACT

Devices, computer-implemented methods, and computer-readable media for a redemption header for merchant offers, such as online coupons, are provided. In some embodiments, an offers website may provide offers, such as online coupons, in a browser executing on a user device. When a user selects an online coupon, the browser is redirected to a merchant website associated with the online coupon and a coupon code value is copied to a clipboard. Additionally, a redemption header having the coupon code and instructions is added in the merchant webpage. A webpage element for the redemption header, such as an inline frame, is created in the merchant webpage and the redemption header is provided based on an offer identifier stored in a browser-accessible storage item such as a cookie.

20 Claims, 13 Drawing Sheets

Related U.S. Application Data

No. 15/853,016, filed on Dec. 22, 2017, now Pat. No. 9,965,769, which is a continuation of application No. 15/471,682, filed on Mar. 28, 2017, now Pat. No. 9,953,335, which is a continuation of application No. 13/837,790, filed on Mar. 15, 2013, now Pat. No. 9,639,853.

(60) Provisional application No. 61/707,527, filed on Sep. 28, 2012, provisional application No. 61/665,740, filed on Jun. 28, 2012, provisional application No. 61/658,408, filed on Jun. 12, 2012, provisional application No. 61/658,404, filed on Jun. 11, 2012, provisional application No. 61/658,387, filed on Jun. 11, 2012.

(52) U.S. Cl.
CPC ..... *G06Q 30/0239* (2013.01); *G06Q 30/0242* (2013.01); *G06Q 30/0255* (2013.01); *G06Q 30/0256* (2013.01); *G06Q 30/0267* (2013.01); *G06Q 30/0269* (2013.01); *H04L 67/02* (2013.01)

(56) References Cited

U.S. PATENT DOCUMENTS

| | | | |
|---|---|---|---|
| 7,302,696 B1 | 11/2007 | Yamamoto | |
| 7,328,435 B2 | 2/2008 | Trifon | |
| 7,533,144 B2 | 5/2009 | Kassab | |
| 7,783,719 B2 | 8/2010 | Miller | |
| 7,870,482 B2 | 1/2011 | Gnech et al. | |
| 7,984,170 B1 * | 7/2011 | Shalla | G06F 9/546 709/217 |
| 8,219,465 B2 | 7/2012 | Aliabadi et al. | |
| 8,230,320 B2 | 7/2012 | Brooks et al. | |
| 8,250,599 B2 | 8/2012 | Zito et al. | |
| 8,330,200 B2 | 12/2012 | Hebert | |
| 8,364,959 B2 * | 1/2013 | Bhanoo | G06Q 20/356 705/64 |
| 8,612,288 B2 | 12/2013 | King | |
| 8,700,449 B2 | 4/2014 | Walsh et al. | |
| 8,732,653 B1 | 5/2014 | Xu | |
| 8,775,245 B2 | 7/2014 | Christie et al. | |
| 8,799,988 B2 | 8/2014 | Conlan et al. | |
| 8,978,106 B2 | 3/2015 | Swamy et al. | |
| 9,015,692 B1 | 4/2015 | Clavel | |
| 9,037,963 B1 | 5/2015 | Chandi et al. | |
| 9,225,510 B1 | 12/2015 | Wharton | |
| 9,240,015 B2 | 1/2016 | Nemitz et al. | |
| 9,747,646 B2 | 8/2017 | Richter et al. | |
| 9,875,477 B2 | 1/2018 | Glore | |
| 9,898,753 B2 | 2/2018 | Lara et al. | |
| 9,972,020 B1 | 5/2018 | Eichler et al. | |
| 2002/0107732 A1 | 8/2002 | Boies et al. | |
| 2004/0133635 A1 | 7/2004 | Spriestersbach et al. | |
| 2004/0210536 A1 | 10/2004 | Gudelj et al. | |
| 2005/0197893 A1 | 9/2005 | Landau et al. | |
| 2005/0209996 A1 | 9/2005 | Stewart | |
| 2006/0149641 A1 * | 7/2006 | Loeb | G06Q 30/02 705/14.39 |
| 2008/0148383 A1 | 6/2008 | Pitchaikani et al. | |
| 2009/0030794 A1 | 1/2009 | Scheflan et al. | |
| 2009/0106296 A1 | 4/2009 | Sickmiller et al. | |
| 2009/0259535 A1 | 10/2009 | Chow | |
| 2010/0095220 A1 | 4/2010 | Kassab | |
| 2011/0040875 A1 | 2/2011 | Scholz et al. | |
| 2011/0153401 A1 | 6/2011 | Jellema et al. | |
| 2012/0166268 A1 | 6/2012 | Griffiths | |
| 2013/0254836 A1 | 9/2013 | Aciicmez et al. | |
| 2016/0180436 A1 | 6/2016 | Arana | |

OTHER PUBLICATIONS

Web Archive of C. Topham, "Creating a Chrome Extension that Uses JQuery to Manipulate the DOM of a Page," https://web.archive.org/web/20120529115827/https://carl-topham.com/theblog/post/creating-chrome-extension-uses-jquery-manipulate-dom-page/, asserted to be captured on May 29, 2012, pp. 1 to 3.

Web Archive of Tutor Tanith, "Creating a Coupon Box in an iFrame," https://web.archive.org/web/20120225141302/http://www.tutortanith.com/couponbox_iFrame.htm, asserted to be captured on Feb. 25, 2012, pp. 1 to 3.

Web Archive of J. Wang, "Improve Cross-Domain Communication with Client-Side Solutions," https://web.archive.org/web/20131014141610/http://www.ibm.com/developerworks/library/wa-crossdomaincomm/, asserted to be published on Jun. 28, 2011, pp. 1 to 21.

Web Archive of XUL, "Why not responseHTML?" https://web.archive.org/web/20120520081321/https://www.xul.fr/ajax/responseHTML-attribute.php, asserted to be captured on May 20, 2012, pp. 1 to 3.

J. Zhong et al., "Pair-Wise Privilege Control for Cross-Domain Private Data Sharing," Association for Information Systems (AIS) Electronic Library (AISeL), ACIS 2010 Proceedings, https://aisel.aisnet.org/cgi/viewcontent.cgi?referer=&httpsredir=1&article=1164&context=pacis2010, asserted to be published in 2010, pp. 1 to 17.

Web Archive of "Declare Permissions—Google Chrome," https://web.archive.org/web/20140323113520/https://developerchrome.com/apps/declare_permissions, asserted to be captured Mar. 23, 2014, pp. 1 to 5.

Web Archive of A. Ranganathan, "cross-site xmlhttprequest with CORS," https://web.archive.org/web/20120527201206/https://hacks.mozilla.org/2009/07/cross-site-xmlhttprequest-with-cors/, asserted to be captured on May 27, 2012, pp. 1 to 33.

Web Archive of A. Barth, "Security in Depth: The Extension System", Chromium Blog, https://web.archive.org/web/20120420150420/https://blog.chromium.org/2009/12/security-in-depth-extension-system.html, asserted to be captured on Apr. 20, 2012, pp. 1 to 7.

Web Archive of C. Dugas, "The iframe cross-domain policy problem," https://web.archive.org/web/20120206210856/http://www.cakemail.com/the-iframe-cross-domain-policy-problem/, asserted to be captured on Feb. 6, 2012, pp. 1 to 10.

Web Archive of "CheapStingyBargains.com," https://web.archive.org/web/20090619152035/http://www.cheapstingybargains.com/, asserted to be captured on Jun. 19, 2009, pp. 1 to 19.

Web Archive of "CouponCabin.com," https://web.archive.org/web/20090416214622/http://www.couponcabin.com/, asserted to be captured on Apr. 16, 2009, pp. 1 to 21.

Web Archive of "CouponsDealuxe.com," https://web.archive.org/web/20091231221008/http://couponsdealuxe.com/, asserted to be captured on Dec. 31, 2009, pp. 1 to 17.

Web Archive of "CouponMountain.com," https://web.archive.org/web/20071024031952/http://www.couponmountain.com/, asserted to be captured on Oct. 24, 2007, pp. 1 to 14.

Web Archive of "DealCatcher.com," https://web.archive.org/web/20111004035025/http://www.dealcatcher.com/, asserted to be captured on Oct. 24, 2011, pp. 1 to 39.

Web Archive of "Offers.com," https://web.archive.org/web/20120413151434/www.offers.com/hp, asserted to be captured on Apr. 13, 2012, pp. 1 to 9.

Web Archive of "RetailMeNot Community Toolbar," https://web.archive.org/web/20120607003617/http://retailmenot.ourtoolbar.com/, asserted to be captured on Jun. 7, 2012, pp. 1 to 2.

Web Archive of "ShopAtHome.com," https://web.archive.org/web/20110330152245/http://www.shopathome.com/, asserted to be captured on Mar. 30, 2011, pp. 1 to 4.

Web Archive of "CouponXplorer Toolbar," https://web.archive.org/web/20120518205856/http://www.couponxplorer.com/index.jhtml, asserted to be captured on May 18, 2012, p. 1.

Web Archive of "Shoptimate Toolbar," https://web.archive.org/web/20110811013108/http://shoptimate.com/, asserted to be captured on Aug. 11, 2011, pp. 1 to 2.

(56) References Cited

OTHER PUBLICATIONS

Web Archive of "Shoptimate Toolbar," https://web.archive.org/web/20120430212411/http://shoptimate.com/, asserted to be captured on Apr. 30, 2012, pp. 1 to 2.
Web Archive of "ShopAtHome.com," https://web.archive.org/web/20120608003830/http://shopathome.com/, asserted to be captured on Jun. 8, 2012, pp. 1 to 3.
Web Archive of "Offers.com," https://web.archive.org/web/20120518040309/www.offers.com/hp, asserted to be captured on May 18, 2012, pp. 1 to 16.
Web Archive of "Cheapstingybargains.com—Dell Discount Coupons Page," https://web.archive.org/web/20090608095116/http://www.cheapstingybargains.com/cheapster/dell/, asserted to be captured on Jun. 8, 2009, pp. 1 to 16.
Rakuten, "Rakuten Affiliate Network Client: CouponCabin—Incremental growth fueled by direct brand relationships + case study," Rakuten Marketing, LLC, https://pubhelp.rakutenmarketing.com/hc/en-us/articles/115004439143-Coupon-Cabin, asserted to be published on Sep. 15, 2017, pp. 1 to 4.
Web Archive of "ShopAtHome.com FAQs," https://web.archive.org/web/20120503063800/http://www.shopathome.com/pages/faqs.aspx#gen13, asserted to be captured on May 3, 2012, pp. 1 to 12.
Web Archive of "Survey Reveals: Online Coupon Sites Remain Top Consumer Choice for Deals," Business Wire, https://web.archive.org/web/20111214095911/https://www.businesswire.com/news/home/20110419005564/en/Survey-Reveals-Online-Coupon-Sites-Remain-Top, asserted to be captured on Dec. 14, 2011, pp. 1 to 7.
Web Archive of Smashing Magazine, "Auto-Save User's Input in Your Forms with HTML5 and Sisyphus.js," https://www.smashingmagazine.com/2011/12/sisyphus-js-client-side-drafts-and-more/, asserted to be published on Dec. 5, 2011, pp. 1 to 8.
Web Archive of Ayenson, et al., "Flash Cookies and Privacy II: Now with HTML5 and ETag Respawning," https://pdfs.semanticscholar.org/42cf/18892910afd15b0d6872f16384a7bb6cf915.pdf,asserted to be captured on Feb. 23, 2019, pp. 1 to 42.
Web Archive of J. Atwood, "Global Network Auto-Login," https://web.archive.org/web/20170617131528/https://stackoverflow.blog/2010/09/11/global-network-auto-login/, asserted to be captured on Jun. 17, 2017, pp. 1 to 8.
Web Archive of J. Celko, "Look-up Tables in SQL," https://web.archive.org/web/20180920050020/https://www.red-gate.com/simple-talk/sql/t-sql-programming/look-up-tables-in-sql/, asserted to be captured on Sep. 20, 2018, pp. 1 to 11.
Web Archive of Coyier, "Pop From Top Notification," https://web.archive.org/web/20120531004053/https://css-tricks.com/pop-from-top-notification/, asserted to be captured on May 31, 2012, pp. 1 to 17.
Web Archive of M. Lou, "Custom Animation Banner with jQuery," https://web.archive.org/web/20120529021733/https://tympanus.net/codrops/2010/10/18/custom-animation-banner/, asserted to be captured on May 29, 2012, pp. 1 to 14.
Web Archive of "CouponsHelper Firefox Add-On," https://web.archive.org/web/20120503055113/https://addons.mozilla.org/en-US/firefox/addon/couponshelper/, asserted to be captured on May 3, 2012, pp. 1 to 1.
Charlton, "How to Deal with Discount Codes in the Checkout Process," https://econsultancy.com/how-to-deal-with-discount-codes-in-the-checkout-process/, asserted to be published Jul. 7, 2009, pp. 1 to 7.
Web Archive of "Chrome Extension Dev: Modifying the DOM using jQuery," https://web.archive.org/web/20121020003141/https://stackoverflow.com/questions/8017463/chrome-extension-dev-modifying-the-dom-using-query, asserted to be captured on Oct. 20, 2012, pp. 1 to 3.
YouTube, "Coupon Servant—The Free Browser Add-On That Saves You Money," https://www.youtube.com/watch?v=xYLwQruGcLk&feature=youtu.be, asserted to be published on Mar. 31, 2011, pp. 1 to 4.
Web Archive of SoftwareDev, "Cross-Domain Communication with iFrames," https://web.archive.org/web/20120525050947/http://softwareas.com/cross-domain-communication-with-iframes/, asserted to be captured on May 25, 2012, pp. 1 to 27.
Web Archive of C. Coyier, "Css-Tricks: Thinking Async," https://web.archive.org/web/20120530183541/https://css-tricks.com/thinking-async/, asserted to be captured on May 30, 2012, pp. 1 to 26.
Web archive of C. Dugas, "The iframe cross-domain policy problem," https://web.archive.org/web/20120206210856/http://www.cakemail.com/the-iframe-cross-domain-policy-problem/, asserted to be captured on Feb. 6, 2012, pp. 1 to 9.
Filip_pag, "Adding banner to webpage," https://forum.netgate.com/topic/40885/adding-banner-to-webpage, asserted to be retrieved on Apr. 1, 2019, pp. 1 to 6.
Freedombi, "HOWTO: redirect affiliate links to cart instead of homepage," https://whmcs.community/topic/46605-howto-redirect-affiliate-links-to-cart-instead-of-homepage/, asserted to be published on Jun. 11, 2008, pp. 1 to 29.
Web Archive of "Get DOM content of cross-domain iframe," https://web.archive.org/web/20120111134535/https://stackoverflow.com/questions/6170925/get-dom-content-of-cross-domain-iframe, asserted to be captured on Jan. 11, 2012, pp. 1 to 2.
Web Archive of "The official Google Code blog: Google Analytics Launches Asynchronous Tracking," https://web.archive.org/web/20120512141112/http://googlecode.blogspot.com/2009/12/google-analytics-launches-asynchronous.html, asserted to be captured on May 12, 2012, pp. 1 to 9.
Gravity Support Forums, "Save user input in cookie and prepopulate form," https://legacy.forums.gravityhelp.com/topic/little-hint-from-me-save-user-input-in-cookie-and-prepopulate-form, asserted to be retrieved on Apr. 1, 2019, pp. 1 to 28.
Gravity Support Forums, "Pre-populate fields with Cookie Data," https://legacy.forums.gravityhelp.com/topic/pre-populate-fields-with-cookie-data, asserted to be retrieved on Apr. 1, 2019, pp. 1 to 5.
Guo, "Cross Cookie: A Cookie Protocol for Web Mashups," in 2008 International Symposium on Electronic Commerce and Security, https://ieeexploreieee.org/document/4606099, asserted to be published in Aug. 2008, pp. 1 to 6.
Web Archive of Stack Overflow, "How does Facebook set cross-domain cookies for iFrames on canvas pages," https://web.archive.org/web/20120602172456/https://stackoverflow.corn/questions/4701922/how-does-facebook-set-cross-domain-cookies-for-iframes-on-canvas-pp., asserted to be captured on Jun. 2, 2012, pp. 1 to 5.
Web Archive of M. Hossain, "Using CORS—HTML5 Rocks," https://web.archive.org/web/20120603051402/https://www.html5rocks.com/en/tutorials/cors/, asserted to be captured Jun. 3, 2012, pp. 1 to 9.
Web Archive of "How to Optimize Your Site with HTTP Caching," https://web.archive.org/web/20120510012706/https://betterexplained.com/articles/how-to-optimize-your-site-with-http-caching/, asserted to be captured on May 10, 2012, pp. 1 to 17.
Pouttu-Clarke, "J2EE Patterns: Cross Domain Cookie Provider,"https://www.theserverside.com/discussions/thread/31258.html, asserted to be published on Jan. 19, 2005, pp. 1 to 13.
C. Jackson, "Subspace: Secure Cross-Domain Communication for Web Mashups"http://wwwconference.org/www2007/papers/paper801.pdf, asserted to be published in May 2007, pp. 1 to 18.
Web Archive of D. Jang, "Analyzing the Cross Domain Policies of Flash Applications," https://web.archive.org/web/20150420075525/https://cseweb.ucsd.edu/~d1jang/paper/w2sp11.pdf, asserted to be captured on Apr. 20, 2015, pp. 1 to 27.
G. Kontaxis et al., "An Empirical Study on the Security of Cross-Domain Policies in Internet Rich Applications," in Proceedings of the 4th European Workshop on System Security (EUROSEC), https://www.cs.uic.edu/~polakis/papers/eurosec2011.pdf, asserted to be published in Apr. 2011, pp. 1 to 7.
Web Archive of R. Lewis, "Authoring Challenges for Device Independence," https://web.archive.org/web/20111127161137/http://www.w3.org/TR/acdi/, asserted to be captured on Nov. 27, 2011, pp. 1 to 41.
Life Hacker, "How to Automatically Fill in Repetitive Web Forms (and Avoid Tons of Tedious Typing)," https://lifehacker.com/how-to-automatically-fill-in-repetitive-web-forms-and-5837922, asserted to be published on Sep. 7, 2011, pp. 1 to 16.

(56) References Cited

OTHER PUBLICATIONS

Web Archive of Q. Luo et al., "Middle-Tier Database Caching for e-Business," https://web.archive.org/web/20100619100142/http://pages.cs.wisc.edu/~naughton/includes/papers/middleTier.pdf, asserted to be captured on Jun. 19, 2010, pp. 1 to 25.
W. Maes, "Browser Protection against Cross-Site Request Forgery," http://www.cs.jhu.edu/~sdoshi/jhuisi650/papers/spimacs/SPIMACS_CD/secucode/p3.pdf, asserted to be published on Nov. 9, 2009, pp. 1 to 8.
Web Archive of E. Marcotte, "Responsive Web Design," http://web.archive.org/web/20130127033801/https://alistapart.com/article/responsive-web-design, asserted to be captured on Jan. 27, 2013, pp. 1 to 7.
D. Mican, "Optimized Advertising Content Delivery in Affiliate Networks" https://www.semanticscholar.org/paper/Optimized-advertising-content-delivery-in-affiliate-Mican/38c1d913b5f58a17eb1f2c27a486c99a2ed46fb9, asserted to be published in 2008, pp. 1 to 16.
J. Miller, "How Redirectors Solve the Third-Party Cookie Problem" https://www.merkleinc.com/blog/how-redirectors-solve-third-party-cookie-problem, asserted to be published on Mar. 24, 2011, pp. 1 to 9.
YouTube, "My Coupon Database," https://www.youtube.corn/watch?v=nw2fXTrJW1A, asserted to be published on Apr. 15, 2010, pp. 1 to 6.
M. Poolet, "Designing for Performance: Lookup Tables," https://www.itprotoday.com/sql-server/designing-performance-lookup-tables, asserted to be published on Jan. 24, 2006, pp. 1 to 9.
YouTube, "PriceBlink Comparison Browser Add-On," https://www.youtube.com/watch?v=UKxMx5bT-QM, asserted to be published on May 11, 2011, pp. 1 to 11.
Web Archive of Q. Street, "Sharing Cookies Across Domains," https://web.archive.org/web/20120531143437/https://www.codeguru.com/csharp/csharp/cs_internet/article.php/c19417/Sharing-Cookies-Across-Domains.htm, asserted to be captured on May 31, 2012, pp. 1 to 12.
Web Archive of Quin Street, "Sharing Cookies Across Domains," http://web.archive.org/web/20120325135848/https://www.codeguru.com/csharp/csharp/cs_internet/article.php/c19417/Sharing-Cookies-Across-Domains.htm, asserted to be captured on Mar. 25, 2012, pp. 1 to 34.
Web Archive of Smashing Magazine, "Speeding Up Your Website's Database," https://web.archive.org/web/20150807174930/https://www.smashingmagazine.com/2011/03/speeding-up-your-websites-database/, asserted to be captured on Aug. 7, 2015, pp. 1 to 46.
Web Archive of Smashing Newsletter, "Local Storage and How to Use it on Websites," https://web.archive.org/web/20150821073507/https://www.smashingmagazine.com/2010/10/local-storage-and-how-to-use-it/, asserted to be captured on Aug. 21, 2015, pp. 1 to 17.
Web Archive of B. Smus, "Chrome extension for thesixtyone," https://web.archive.org/web/20111110232046/https://smus.com/chrome-extension-mashups/, asserted to be captured on Nov. 10, 2011, pp. 1 to 4.
Web Archive of S. Souders, "Don't docwrite scripts," https://web.archive.org/web/20120508103904/https://www.stevesouders.com/blog/2012/04/10/dont-docwrite-scripts/, asserted to be captured on May 8, 2012, pp. 1 to 7.
Web Archive of Stack Overflow, "Creating Chrome Extension—How do I populate a form," https://web.archive.org/web/20150522033811/https://stackoverflow.com/questions/3152245/creating-chrome-extension-how-do-i-populate-a-form, asserted to be captured on May 22, 2015, pp. 1 to 3.
Web Archive of Stack Overflow, "Chrome Extension—edit a text field," https://web.archive.org/web/20121127061411/https://stackoverflow.com/questions/11852515/chrome-extension-edit-a-text-field, asserted to be captured on Nov. 27, 2012, pp. 1 to 3.
Web Archive of Stack Overflow, "Chrome Extension Dev: Modifying the DOM using jQuery," https://web.archive.org/web/20121020003141/https://stackoverflow.com/questions/8017463/chrome-extension-dev-modifying-the-dom-using-query, asserted to be captured on Oct. 20, 2012, pp. 1 to 3.
Web Archive of Stack Overflow, "How to fill in form field, and submit, using javascript?," https://web.archive.org/web/20130304072556/https://stackoverflow.com/questions/4683331/how-to-fill-in-form-field-and-subm it-using-javascript, asserted to be captured on Mar. 4, 2013, pp. 1 to 2.
Web Archive of Stack Overview, "How do I get images from database for Cross Slide image gallery?," https://web.archive.org/web/20151218133051/https://stackoverflow.com/questions/7087785/how-do-i-get-images-from-database-or-cross-slide-image-gallery, asserted to be captured on Dec. 18, 2015, pp. 1 to 2.
Web Archive of Stack Overflow, "If cookie does not exist alert and redirect," https://web.archive.org/web/20130313195304/https://stackoverflow.com/questions/9145187/if-cookie-does-not-exist-alert-and-redirect, asserted to be captured on Mar. 13, 2013, pp. 1 to 5.
Web Archive of Table for 7 Media, "Help & Support," https://web.archive.org/web/20120521102516/https://tablefor7media.com/search-n-save/help-support, asserted to be captured on May 21, 2012, pp. 1 to 9.
V. Gowadia, et al., "Secure Cross-Domain Data Sharing Architecture for Crisis Management," Proceeding DRM '10 Proceedings of the tenth annual ACM workshop on Digital rights management, asserted to be published on Oct. 4, 2010, pp. 1 to 36.

\* cited by examiner

DEVICES, METHODS, AND COMPUTER-READABLE MEDIA FOR REDEMPTION HEADER FOR MERCHANT OFFERS

CROSS-REFERENCE TO RELATED APPLICATIONS

The present application is a continuation of U.S. patent application Ser. No. 15/944,469 filed on Apr. 3, 2018, which is a continuation of U.S. patent application Ser. No. 15/853,016 filed on Dec. 22, 2017, which is a continuation of U.S. patent application Ser. No. 15/471,682 filed on Mar. 28, 2017, which is a continuation of U.S. patent application Ser. No. 13/837,790 filed on Mar. 15, 2013, now U.S. Pat. No. 9,639,853, which claims the benefit of each of the following U.S. Provisional Patent Applications: Provisional Application No. 61/707,527, filed Sep. 28, 2012; Provisional Application No. 61/665,740, filed Jun. 28, 2012; Provisional Application No. 61/658,408, filed Jun. 12, 2012; Provisional Application No. 61/658,404, filed Jun. 11, 2012; and Provisional Application No. 61/658,387, filed Jun. 11, 2012. Each aforementioned patent filing is incorporated by reference in its entirety.

BACKGROUND OF THE INVENTION

1. Field of the Invention

This invention relates generally to merchant offers for goods and service and, more particularly, to redemption of certain offers such as online coupons.

2. Description of the Related Art

Offer-discovery systems provide a service by which merchants inform customers of offers, for example deals (e.g., discounts, favorable shipping terms, or rebates) or coupons (e.g., printable coupons for in-store use or coupon codes for use online). Typically, the systems store information about offers from a relatively large number of merchants and provide an interface by which customers can identify offers in which the customer is likely to be interested. Merchants have found the offer-discovery systems to be a relatively effective form of marketing, as cost-sensitive consumers are drawn to such systems due to their relatively comprehensive listings of offers. Such offers may include coupons, such as include traditional in-store coupons, and online coupons typically obtained via the Internet, such as from merchant websites, e-mail distributions, etc. To use an online coupon, a customer typically provides an identifier, such as a coupon code, when purchasing goods and services from a merchant's online store. However, a customer may forget about the existence of the coupon and, as a result, fail to take advantage of the offer presented by the coupon. Additionally, it may be challenging for a customer to remember the identifier presented by the coupon and to use the online coupon in the manner specified by the online store. And, the advent of smaller computing devices having different or limited interfaces may increase the challenges faces by customers attempting to use online coupons.

SUMMARY OF THE INVENTION

Various embodiments of devices, computer-implemented methods, and computer-readable media for a redemption header for merchant offers are provided herein. In some embodiments, a method is provided that includes providing (e.g., obtaining and rendering) in a browser executing on a user device an offers webpage from an offers engine, the offers webpage having: a plurality of offers associated with a respective plurality of merchants and a respective plurality of offer redemption identifiers. The method also includes receiving a selection of one of the plurality of offers, the selected offer associated with a selected offer redemption identifier and a selected merchant. The method further includes redirecting the browser to a merchant webpage of the selected merchant. Additionally, the method includes determining, with one or more processors, whether an offer identifier associated with the selected offer is stored in a storage item accessible by the browser. The method further includes inserting, if (e.g., if and only if) the offer identifier is stored in the storage item, a redemption header in a webpage element of the merchant webpage, the redemption header including the offer identifier associated with the selected offer and the redemption header being displayed on the merchant webpage. The method further includes providing, if the offer identifier is not stored in the storage item, an empty webpage element of the merchant webpage.

Additionally, in some embodiments, a non-transitory computer-readable medium having executable computer code stored thereon is provided. The executable computer code includes instructions that, when executed, cause one or more processors to effectuate operations including the following: providing in a browser executing on a user device an offers webpage from an offers engine, the offers webpage having a plurality of offers associated with a respective plurality of merchants and a respective plurality of offer redemption identifiers and receiving a selection of one of the plurality of offers, the selected offer associated with a selected offer redemption identifier and a selected merchant. Additionally, the executable computer code includes instructions that, when executed, cause one or more processors to perform the following: redirecting the browser to a merchant webpage of the selected merchant. The executable computer code further includes instructions that, when executed, cause one or more processors to perform the following: determining, by one or more processors, whether an offer identifier associated with the selected offer is stored in a storage item accessible by the browser. The executable computer code further includes instructions that, when executed, cause one or more processors to perform the following: inserting, if the offer identifier is stored in the storage item, a redemption header in a webpage element of the merchant webpage, the redemption header including the offer redemption identifier associated with the selected offer and the redemption header being displayed on the merchant webpage. The executable computer code further includes instructions that, when executed, cause one or more processors to perform the following: providing, if the offer identifier is not stored in the storage item, an empty webpage element of the merchant webpage.

Further, in some embodiments, a system is provided that includes one or more processors and a non-transitory tangible computer-readable memory communicatively coupled to the processor. The non-transitory tangible computer-readable memory includes executable computer code stored thereon. The executable computer code includes instructions that, when executed, cause one or more processors to perform the following: providing in a browser executing on a user device an offers webpage from an offers engine, the offers webpage comprising a plurality of offers associated with a respective plurality of merchants and a respective plurality of offer redemption identifiers and receiving a selection of one of the plurality of offers, the selected offer associated with a selected offer redemption identifier and a selected merchant. Additionally, the executable computer code includes instructions that, when executed, cause one or more processors to perform the following: redirecting the browser to a merchant webpage of the selected merchant. The executable computer code further includes instructions that, when executed, cause one or more processors to perform the following: determining, by one or more processors, whether an offer identifier associated with the selected offer is stored in a storage item accessible by the browser. The executable computer code further includes instructions that, when executed, cause one or more processors to perform the following: inserting, if the offer identifier is stored in the storage item, a redemption header in a webpage element of the merchant webpage, the redemption header including the offer redemption identifier associated with the selected offer and the redemption header being displayed on the merchant webpage. The executable computer code further includes instructions that, when executed, cause one or more processors to perform the following: providing, if the offer identifier is not stored in the storage item, an empty webpage element of the merchant webpage.

DETAILED DESCRIPTION

Figure 1:
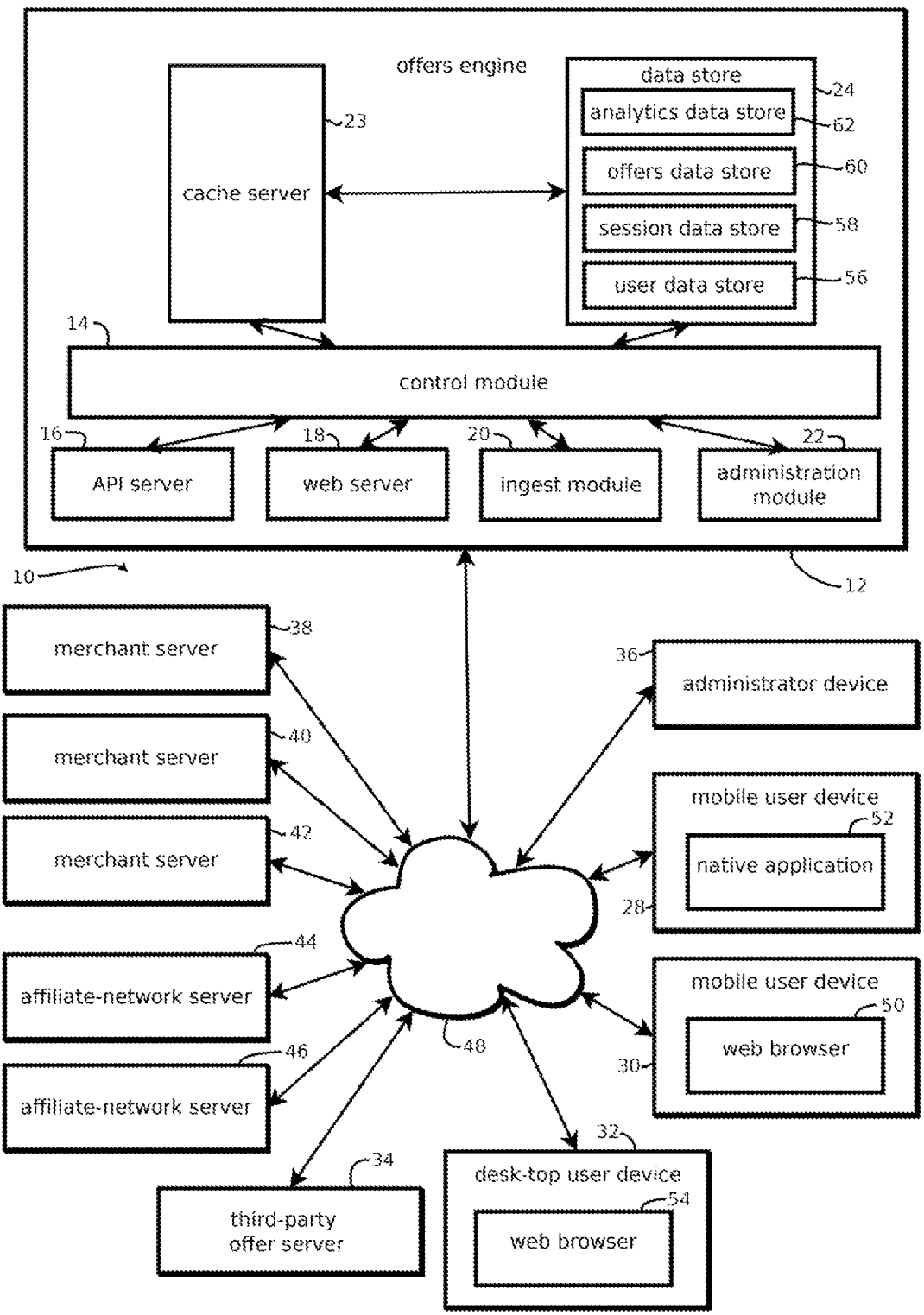
FIG. 1 is a schematic block diagram of an example of an offer-discovery system in accordance with some embodiments.

The above-mentioned deficiencies in existing offer-discovery systems may be mitigated by certain embodiments of an offer-discovery system 10 illustrated by FIG. 1. The exemplary system 10 includes an offers engine 12 that, in some embodiments, is capable of reducing the burden on users attempting to identify offers relevant to them from among a relatively large pool of offers (e.g., more than 100, more than 1,000, or more than 10,000) and redeem selected offers. The system 10 provides instructions to user devices that, when executed by the user devices, implement an offer redemption user interface described below with reference to FIGS. 4-6. This interface, in some cases, assets the user with recall and entry of a coupon code or other offer-related data at a merchant's website. This interface and the associated instructions are described in greater detail below, following a description of other aspects of the system 10, which provides complimentary, but independent benefits to those of the interfaces of FIGS. 4-6.

In some embodiments, the offers engine 12 maintains device-independent user profiles (or portions of user profiles) by which offers interfaces may be relatively consistently configured across multiple user devices with which the user interacts with the offers engine 12. Further, the offers engine 12, in some embodiments, includes a number of features expected to facilitate relatively quick identification of relevant offers by a user, features that include cached storage of data related to likely relevant offers, faceted presentation of offers by which users can select among offers within various categories, and a number of other techniques described below for assisting with offer identification. The offers engine 12 is also expected to facilitate relatively low operating costs by, in some embodiments, automating parts of the process by which offer related data is acquired from sources, such as affiliate networks merchants, administrators, or users, and automating parts of the process by which transaction data indicative of acceptance, settlement, or clearing of offers is obtained and processed.

These and other benefits are described in greater detail below, after introducing the components of the system 10 and describing their operation. It should be noted, however, that not all embodiments necessarily provide all of the benefits outlined herein, and some embodiments may provide all or a subset of these benefits or different benefits, as various engineering and cost tradeoffs are envisioned.

In the illustrated embodiment, the offers engine 12 includes a control module 14, an application program interface (API) server 16, a web server 18, an ingest module 20, an administration module 22, a data store 24, and a cache server 23. These components, in some embodiments, communicate with one another in order to provide the functionality of the offers engine 12 described herein. As described in greater detail below, in some embodiments, the data store 24 may store data about offers and users' interactions with those offers; the cache server 23 may expedite access to this data by storing likely relevant data in relatively high-speed memory, for example, in random-access memory or a solid-state drive; the web server 20 may serve webpages having offers interfaces by which users discover relevant offers; the API server 16 may serve data to various applications that process data related to offers; the ingest module 20 may facilitate the intake of data related to offers from affiliate networks, users, administrators, and merchants; and the administration module 22 may facilitate curation of offers presented by the API server 16 and the web server 18. The operation of these components 16, 18, 20, 22, 24, and 23 may be coordinated by the control module 14, which may bidirectionally communicate with each of these components or direct the components to communicate with one another. Communication may occur by transmitting data between separate computing devices (e.g., via transmission control protocol/internet protocol (TCP/IP) communication over a network), by transmitting data between separate applications or processes on one computing device; or by passing values to and from functions, modules, or objects within an application or process, e.g., by reference or by value.

Among other operations, the offers engine 12 of this embodiment presents offers to users; receives data from users about their interaction with the offers (for example, the user's favorite offers or offer attributes; statistics about the offers the user has identified, accepted, or otherwise provided data about; or the identity of other users with whom the user communicates about offers and the content of those communications; provided that users opt to have such data obtained); customizes the presentation of offers based on this received data; and facilitates the processing of compensation from merchants (either directly or through affiliate networks) as a result of users accepting (or taking a specific action, like clicking or viewing, in some embodiments or use cases) offers. This interaction with users may occur via a website viewed on a desktop computer, tablet, or a laptop of the user. And in some cases, such interaction occurs via a mobile website viewed on a smart phone, tablet, or other mobile user device, or via a special-purpose native application executing on a smart phone, tablet, or other mobile user device. Presenting and facilitating interaction with offers across a variety of devices is expected to make it easier for users to identify and recall relevant offers at the time the user is interested in those offers, which is often different from the time at which the user first discovers the offers. In particular, some embodiments allow users to store data indicative of offers relevant to that user using one device, such as a desktop computer in the user's home, and then view those offers at a later time, such as on a native mobile application when in a retail store.

To illustrate an example of the environment in which the offers engine 12 operates, the illustrated embodiment of FIG. 1 includes a number of components with which the offers engine 12 communicates: mobile user devices 28 and 30; a desk-top user device 32; a third party server 34; an administrator device 36; merchant servers 38, 40, and 42; and affiliate-network servers 44 and 46. Each of these devices communicates with the offers engine 12 via a network 48, such as the Internet or the Internet in combination with various other networks, like local area networks, cellular networks, or personal area networks.

The mobile user devices 28 and 30 may be smart phones, tablets, gaming devices, or other hand-held networked computing devices having a display, a user input device (e.g., buttons, keys, voice recognition, or a single or multi-touch touchscreen), memory (such as a tangible, machine-readable, non-transitory memory), a network interface, a portable energy source (e.g., a battery), and a processor (a term which, as used herein, includes one or more processors) coupled to each of these components. The memory of the mobile user devices 28 and 30 may store instructions that when executed by the associated processor provide an operating system and various applications, including a web browser 50 or a native mobile application 52. The native application 52, in some embodiments, is operative to provide an offers interface that communicates with the offers engine 12 and facilitates user interaction with data from the offers engine 12. Similarly, the web browser 50 may be configured to receive a website from the offers engine 12 having data related to deals and instructions (for example, instructions expressed in JavaScript™) that when executed by the browser (which is executed by the processor) cause the mobile user device to communicate with the offers engine 12 and facilitate user interaction with data from the offers engine 12. The native application 52 and the web browser 50, upon rendering a webpage from the offers engine 12, may generally be referred to as client applications of the offers engine 12, which in some embodiments may be referred to as a server. Embodiments, however, are not limited to client/server architectures, and the offers engine 12, as illustrated, may include a variety of components other than those functioning primarily as a server.

The desk-top user device 32 may also include a web browser 54 that serves the same or similar role as the web browser 50 in the mobile user device 30. In addition, the desk-top user device 32 may include a monitor; a keyboard; a mouse; memory; a processor; and a tangible, non-transitory, machine-readable memory storing instructions that when executed by the processor provide an operating system and the web browser.

Third-party offer server 34 may be configured to embed data from the offers engine 12 in websites or other services provided by the third-party offer server 34. For example, third-party offer server 34 may be a server of a social networking service upon which users post comments or statistics about offers with which the user has interacted, or the users may use the offer server 34 to recommend offers to others or identify offers to avoid. In another example, third-party offer server 34 may include various services for publishing content to the Web, such as blogs, tweets, likes, dislikes, ratings, and the like. In another example, third-party offer server 34 provides services by which third-parties curate offers hosted by the offers engine 12.

Merchant servers 38, 40, and 42 host websites or other user accessible content interfaces by which users can accept offers hosted by the offers engine 12. In some embodiments, and in some use cases, the merchant servers 38, 40, and 42 host retail websites that present a plurality of items for sale by the merchant, a subset of which may include items to which offers apply, thereby generally making the item for sale more desirable to cost-sensitive consumers than under the terms presented by the merchant in the absence of the offer. For example, the offers may include free or discounted shipping, a discounted price, a bulk discount, a rebate, a referral award, or a coupon, such as a coupon acceptable by presenting a coupon code during checkout on the merchant website, or a printable or displayable coupon (e.g., on the screen of a mobile device) for in-store use, the printable or otherwise displayable coupon having, in some cases, a machine readable code (e.g., a bar code or QR code for display and scanning, or a code passed via near-field communication or Bluetooth™). In some embodiments, the merchant website includes a checkout webpage having an interface for the user to enter payment information and a coupon code, and the merchant website (either with logic on the client side or the server-side) may validate the coupon code entered by the user and, upon determining that the coupon code is valid, adjust the terms presented to the user for acceptance in accordance with the offer.

Some merchants may limit the number of uses of a given coupon, limit the duration over which the coupon is valid, or apply other conditions to use of the coupon, each of which may add to the burden faced by users seeking to find valid coupons applicable to an item the user wishes to purchase. As noted above, some embodiments of the offers engine 12 are expected to mitigate this burden.

Further, in some embodiments, the merchant servers 38, 40, and 42 provide data about offers to the offers engine 12 or (i.e., and/or, as used herein, unless otherwise indicated) data about transactions involving offers. In use cases in which the operator of the offers engine 12 has a direct affiliate-marketing relationship with one of the merchants of the merchant servers 38, 40, or 42, the transaction data may provide the basis for payments by the merchant directly to the operator of the offers engine 12. For example, payments may be based on a percentage of transactions to which offers were applied, a number of sales to which offers were applied, or a number of users who viewed or selected or otherwise interacted with an offer by the merchant.

Affiliate-network servers 44 and 46, in some embodiments and some use cases, are engaged when the entity operating the offers engine 12 does not have a direct affiliate-marketing relationship with the merchant making a given offer. In many affiliate marketing programs, merchants compensate outside entities, such as third-party publishers, for certain activities related to sales by that merchant and spurred by the outside entity. For example, in some affiliate marketing programs, merchants compensate an affiliate, such as the entity operating the offers engine 12, in cases in which it can be shown that the affiliate provided a given coupon code to a given user who then used that coupon code in a transaction with the merchant. Demonstrating this connection to the merchant is one of the functions of the affiliate-networks.

Affiliate-networks are used, in some use cases, because many coupon codes are not affiliate specific and are shared across multiple affiliates, as the merchant often desires the widest distribution of a relatively easily remembered coupon code. Accordingly, in some use cases, the merchant, affiliate network, and affiliate cooperate to use client-side storage to indicate the identity of the affiliate that provided a given coupon code to a user. To this end, in some embodiments, when a webpage offers interface is presented by the offers engine 12 in the web browsers 50 or 54, that webpage is configured by the offers engine 12 to include instructions to engage the affiliate network server 44 or 46 when a user selects an offer, for example, by clicking on, touching, or otherwise registering a selection of an offer. The website provided by the offers engine 12 responds to such a selection by, in some embodiments, transmitting a request to the appropriate affiliate-network server 44 or 46 (as identified by, for example, an associated uniform resource locator (URL) in the webpage) for a webpage or portion of a webpage (e.g., browser-executable content). The request to the affiliate-network server may include (e.g., as parameters of the URL) an identifier of the affiliate, the offer, and the merchant, and the returned content from the affiliate-network server may include instructions for the web browser 50 or 54 to store in memory (e.g., in a cookie, or other form of browser-accessible memory, such as a SQLite database or in a local Storage object via a localStorage.setItem command) an identifier of the affiliate that provided the offer that was selected.

The webpage from the offers engine 12 (or the content returned by the affiliate network server 44 or 46) may further include browser instructions to navigate to the website served by the merchant server 38, 40, or 42 of the merchant associated with the offer selected by the user, and in some cases to the webpage of the item or service associated with the offer selected by the user. When a user applies the offer, for example by purchasing the item or service or purchasing the item or service with the coupon code, the merchant server 38, 40, or 42 may transmit to the user device upon which the item was purchased browser instructions to request content from the affiliate network server 44 or 46, and this requested content may retrieve from the client-side memory the identifier of the affiliate, such as the operator of the offers engine 12, who provided the information about the offer to the user. The affiliate network may then report to the merchant the identity of the affiliate who should be credited with the transaction, and the merchant may compensate the affiliate (or the affiliate network may bill the merchant, and the affiliate network may compensate the affiliate), such as the operator of the offers engine 12. Thus, the affiliate network in this example acts as an intermediary, potentially avoiding the need for cross-domain access to browser memory on the client device, a feature which is generally not supported by web browsers for security reasons. (Some embodiments may, however, store in client-side browser-accessible memory an identifier of the affiliate upon user selection of the offer, with this value designated as being accessible via the merchant's domain, and provide the value to the merchant upon a merchant request following acceptance of the offer, without passing the identifier through an affiliate network, using a browser plug-in for providing cross-domain access to browser memory or a browser otherwise configured to provide such access.)

A similar mechanism may be used by the native application 52 for obtaining compensation from merchants. In some embodiments, the native application 52 includes or is capable of instantiating a web browser, like the web browser 50, in response to a user selecting an offer presented by the native application 52. The web browser instantiated by the native application 52 may be initialized by submitting the above-mentioned request for content to the affiliate-network server 44 or 46, thereby storing an identifier of the affiliate (i.e., the entity operating the offers engine 12 in this example) in client-side storage (e.g., in a cookie, localStorage object, or a database) of the mobile user device 28, and thereby navigating that browser to the merchant website. In other use cases, the operator of the offers engine 12 has a direct relationship with the merchant issuing the offer, and the selection of an offer within the native application 52 or the desktop or mobile website of the offers engine 12 (generally referred to herein as examples of an offer interface) may cause the user device to request a website from the associated merchant with an identifier of the affiliate included in the request, for example as a parameter of a URL transmitted in a GET request to the merchant server 38, 40, or 42 for the merchant's website.

Administrator device 36 may be a special-purpose application or a web-based application operable to administer operation of the offers engine 12, e.g., during use by employees or agents of the entity operating the offers engine 12. In some embodiments, the administration module 22 may communicate with the administrator device 36 to present an administration interface at the administrator device 36 by which an administrator may configure offers interfaces presented to users by the offers engine 12. In some embodiments, the administrator may enter offers into the offers engine 12; delete offers from the offers engine 12; identify offers for prominent placement within the offers interface (e.g., for initial presentation prior to user interaction); moderate comments on offers; view statistics on offers, merchants, or users; add content to enhance the presentation of offers; or categorize offers.

Thus, the offers engine 12, in some embodiments, operates in the illustrated environment by communicating with a number of different devices and transmitting instructions to various devices to communicate with one another. The number of illustrated merchant servers, affiliate network servers, third-party servers, user devices, and administrator devices is selected for explanatory purposes only, and embodiments are not limited to the specific number of any such devices illustrated by FIG. 1.

The offers engine 12 of some embodiments includes a number of components introduced above that facilitate the discovery of offers by users. For example, the illustrated API server 16 may be configured to communicate data about offers via an offers protocol, such as a representational-state-transfer (REST)-based API protocol over hypertext transfer protocol (HTTP). Examples of services that may be exposed by the API server 18 include requests to modify, add, or retrieve portions or all of user profiles, offers, or comments about offers. API requests may identify which data is to be modified, added, or retrieved by specifying criteria for identifying records, such as queries for retrieving or processing information about particular categories of offers, offers from particular merchants, or data about particular users. In some embodiments, the API server 16 communicates with the native application 52 of the mobile user device 28 or the third-party offer server 34.

The illustrated web server 18 may be configured to receive requests for offers interfaces encoded in a webpage (e.g. a collection of resources to be rendered by the browser and associated plug-ins, including execution of scripts, such as JavaScript™, invoked by the webpage). In some embodiments, the offers interface may include inputs by which the user may request additional data, such as clickable or touchable display regions or display regions for text input. Such inputs may prompt the browser to request additional data from the web server 18 or transmit data to the web server 18, and the web server 18 may respond to such requests by obtaining the requested data and returning it to the user device or acting upon the transmitted data (e.g., storing posted data or executing posted commands). In some embodiments, the requests are for a new webpage or for data upon which client-side scripts will base changes in the webpage, such as XMLHttpRequest requests for data in a serialized format, e.g. JavaScript™ object notation (JSON) or extensible markup language (XML). The web server 18 may communicate with web browsers, such as the web browser 50 or 54 executed by user devices 30 or 32. In some embodiments, the webpage is modified by the web server 18 based on the type of user device, e.g., with a mobile webpage having fewer and smaller images and a narrower width being presented to the mobile user device 30, and a larger, more content rich webpage being presented to the desk-top user device 32. An identifier of the type of user device, either mobile or non-mobile, for example, may be encoded in the request for the webpage by the web browser (e.g., as a user agent type in an HTTP header associated with a GET request), and the web server 18 may select the appropriate offers interface based on this embedded identifier, thereby providing an offers interface appropriately configured for the specific user device in use.

The illustrated ingest module 20 may be configured to receive data about new offers (e.g., offers that are potentially not presently stored in the data store 24), such as data feeds from the affiliate network servers 44 and 46, identifications of offers from user devices 28, 30, or 32, offers identified by third-party offer server 34, offers identified by merchant servers 38, 40, or 42, or offers entered by an administrator via the administrator device 36. In some embodiments, the ingest module 20 may respond to receipt of a record identifying a potentially new offer by querying the data store 24 to determine whether the offer is presently stored. Upon determining that the offer is not presently stored by the data store 24, the ingest module 20 may transmit a request to the data store 24 to store the record. In some cases, the data about new offers may be an affiliate data-feed from an affiliate network containing a plurality of offer records (e.g., more than 100), each record identifying offer terms, a merchant, a URL of the merchant associated with the offer, a product description, and an offer identifier. The ingest module 22 may periodically query such data-feeds from the affiliate-network servers 44 or 46, parse the data-feeds, and iterate through (or map each entry to one of a plurality of processes operating in parallel) the records in the data-feeds. Bulk, automated processing of such data-feeds is expected to lower operating costs of the offers engine 12.

The administration module 22 may provide an interface by which an administrator operating the administrator device 36 curates and contextualizes offers. For example, the administration module 22 may receive instructions from administrator that identify offers to be presented in the offer interface prior to user interaction with the offer interface, or offers to be presented in this initialized offers interface for certain categories of users, such as users having certain attributes within their user profile. Further, in some embodiments, the administration module 22 may receive data descriptive of offers from the administrator, such as URLs of images relevant to the offer, categorizations of the offer, normalized data about the offer, and the like.

The illustrated data store 24, in some embodiments, stores data about offers and user interactions with those offers. The data store 24 may include various types of data stores, including relational or non-relational databases, document collections, hierarchical key-value pairs, or memory images, for example. In this embodiment, the data store 24 includes a user data store 56, a session data store 58, an offers data store 60, and an analytics data store 62. These data stores 56, 58, 60, and 62 may be stored in a single database, document, or the like, or may be stored in separate data structures.

In this embodiment, the illustrated user data store 56 includes a plurality of records, each record being a user profile and having a user identifier, a list of offers (e.g., identifiers of offers) identified by the user as favorites, a list of categories of offers identified by the user as favorites, a list of merchants identified by the user as favorites, account information for interfacing with other services to which the user subscribes (e.g., a plurality of access records, each record including an identifier of a service, a URL of the service, a user identifier for the service, an OAuth access token credential issued by the service at the user's request, and an expiration time of the credential), a user password for the offers engine 12, a location of the user device or the user (e.g., a zip code of the user), and a gender of the user. In some embodiments, each user profile includes a list of other users identified by the user of the user profile as being people in whose commentary on, or curation of, offers the user is interested, thereby forming an offers-interest graph. In some embodiments, users have control of their data, including what is stored and who can view the data, and can choose to opt-in to the collection and storage of such user data to improve their experience with the offers engine 12.

In this embodiment, the session data store 58 stores a plurality of session records, each record including information about a session a given user is having or has had with the offers engine 12. The session records may specify a session identifier, a user identifier, and state data about the session, including which requests have been received from the user and what data has been transmitted to the user. Session records may also indicate the IP address of the user device, timestamps of exchanges with the user device, and a location of the user device (e.g., retail store or aisle in a retail store in which the user device is located).

The illustrated offers data store 60, in some embodiments, includes a plurality of offer records, each offer record may identify a merchant, offers by that merchant, and attributes of the relationship with the merchant, e.g., whether there is a direct relationship with the merchant by which the merchant directly compensates the operator of the offers engine 12 or whether the merchant compensates the operator of the offers engine 12 via an affiliate network and which affiliate network. The offers by each merchant may be stored in a plurality of merchant-offer records, each merchant-offer record may specify applicable terms and conditions of the offer, e.g., whether the offer is a discount, includes free or discounted shipping, requires purchase of a certain number of items, is a rebate, or is a coupon (which is not to suggest that these designations are mutually exclusive). In records in which the offer is a coupon, the record may further indicate whether the coupon is for in-store use (e.g. whether the coupon is associated with a printable image for presentation at a point-of-sale terminal, a mobile device-displayable image, or other mediums) or whether the coupon is for online use and has a coupon code, in which case the coupon code is also part of the merchant-offer record. The merchant-offer records may also include an expiration date of the offer, comments on the offer, rankings of the offer by users, a time at which the offer was first issued or entered into the offers engine 12, and values (e.g., binary values) indicating whether users found the offer to be effective, with each value or ranking being associated with a timestamp, in some embodiments. The values and rankings may be used to calculate statistics indicative of the desirability of the offer and likely success of accepting the offer. The timestamps associated with the values, rankings, and time of issuance or entry into the offers engine 12 may also be used to weight rankings of the offer, with older values being assigned less weight than newer values and older offers being ranked lower than newer offers, all other things being equal, as many offers expire or have a limited number of uses.

The illustrated analytics data store 62 may store a plurality of records about historical interactions with the offers engine 12, such as aggregate statistics about the performance of various offers. In some embodiments, the analytics data store 62 stores a plurality of transaction records, each transaction record identifying an offer that was accepted by a user at a merchant, the merchant, the time of presentation of the offer to the user, and an indicator of whether the merchant has compensated the entity operating the offers engine 12 for presentation of the offer to the user. Storing and auditing these transaction records is expected to facilitate relatively accurate collection of payments owed by merchants and identification of future offers likely to lead to a relatively high rates of compensation for prominent presentation based on past performance of offers having similar attributes.

The cache server 23 stores a subset of the data in the data store 24 that is among the more likely data to be accessed in the near future. To facilitate relatively fast access, the cache server 23 may store cached data in relatively high speed memory, such as random access memory or a solid-state drive. The cached data may include offers entered into the offers engine 12 within a threshold period of time, such as offers that are newer than one day. In another example, the cache data may include offers that are accessed with greater than a threshold frequency, such as offers that are accessed more than once a day, or offers accessed within the threshold, such as offers accessed within the previous day. Caching such offer data is expected to facilitate faster access to offer data than systems that do not cache offer data.

The illustrated control module 14, in some embodiments, controls the operation of the other components of the offers engine 12, receiving requests for data or requests to add or modify data from the API server 16, the web server 18, the ingest module 20, and the administration module 22, and instructing the data store 24 to modify, retrieve, or add data in accordance with the request. The control module 14 may further instruct the cache server 23 to modify data mirrored in the cache server 23. In some embodiments, the cache server 23 may be updated hourly, and inconsistent data may potentially be maintained in the cache server 23 in order to conserve computing resources.

The illustrated components of the offers engine 12 are depicted as discrete functional blocks, but embodiments are not limited to systems in which the functionality described herein is organized as illustrated by FIG. 1. The functionality provided by each of the components of the offers engine 12 may be provided by software or hardware modules that are differently organized than is presently depicted, for example such software or hardware may be intermingled, broken up, distributed (e.g. within a data center or geographically), or otherwise differently organized. The functionality described herein may be provided by one or more processors of one or more computers executing code stored on a tangible, non-transitory, machine readable medium.

Figure 2:
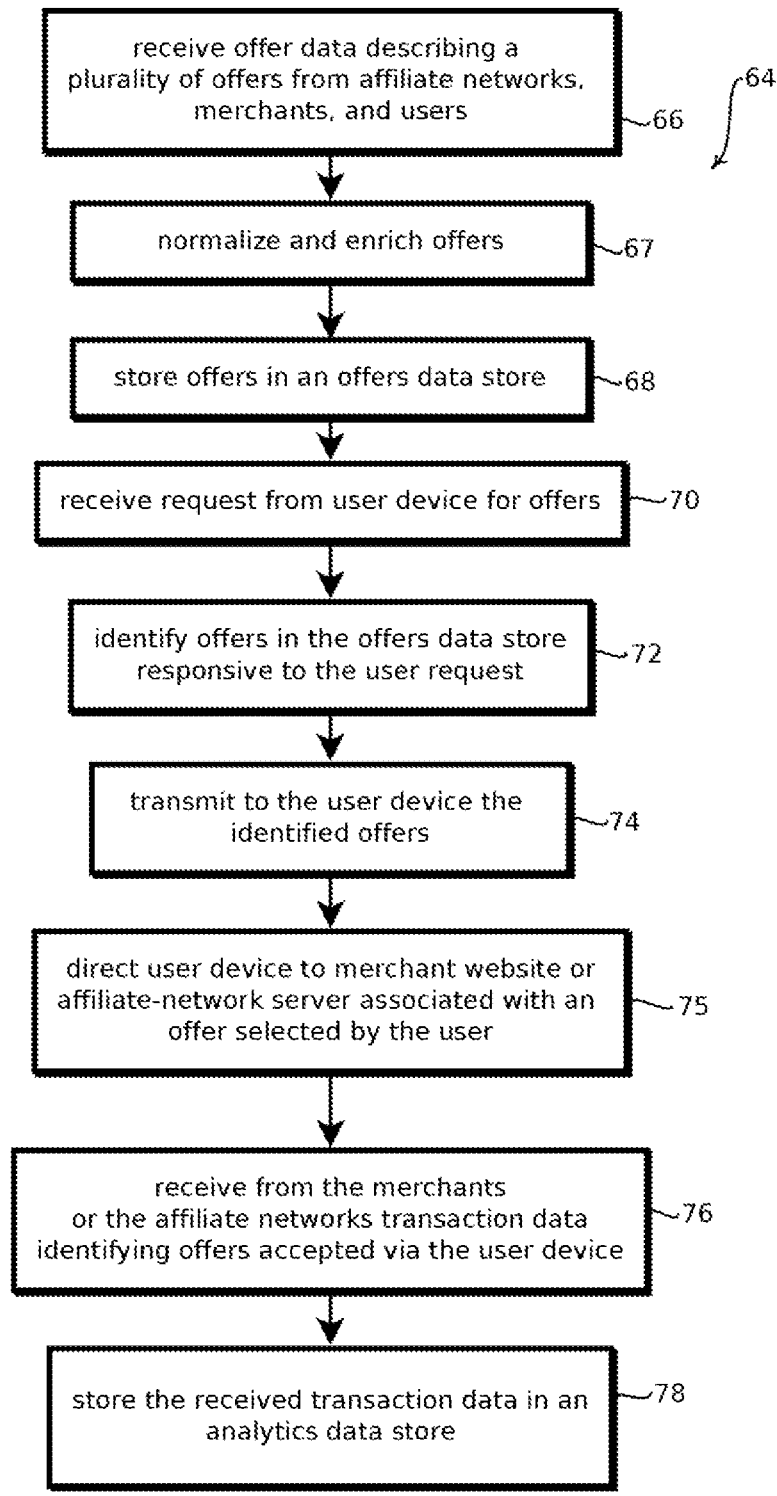
FIG. 2 is a block diagram an example of a process by which an offers engine in the offer-discovery system of FIG. 1, in some embodiments, obtains and processes data related to offers.

FIG. 2 is a flowchart of a process 64 for acquiring data related to offers within some embodiments of the offer engine 12 discussed above. In this embodiment, the process 64 begins with receiving offer data describing a plurality of offers from affiliate networks, merchants, and users, as illustrated by block 66. This step may be performed by the above-mentioned ingest module 20. As noted above, the received offer data may be received from one or all of these sources. The received offer data may be received via an offer interface by which users associated with these sources enter data about offers, or the received offer data may be received in a predefined format, such as a serialized data format, in an automatic data feed pushed or pulled periodically or in response to the availability of new data from affiliate networks or merchants. Receiving the offer data may include determining whether the offer data is redundant to offer data already received and normalizing the offer data.

The process 64, in some embodiments, includes normalizing and enriching the offer data. Normalizing may include normalizing field names of the data and normalizing the way in which dates are expressed, for example. Enriching may include associating images with the offers for presentation with the offers and adding metadata to the offers to assist users searching for offers.

Next, in the present embodiment, the received offer data is stored in an offer data store, as indicated by block 68. Storing the offer data in the offer data store may include identifying a merchant to which the offer pertains and storing the offer in a merchant-offer record associated with that merchant. Further, some embodiments may include inserting the offer in order in a sorted list of offers for relatively fast retrieval of offers using a binary search algorithm or other techniques to facilitate relatively quick access to data that has been preprocessed (e.g., using a prefix trie). In some embodiments, storing the received offer may further include updating hash tables by which the offer may be retrieved according to various parameters, each hash table being associated with one parameter and including a hash key value calculated based on the parameter and paired with an address of the offer. Such hash tables are expected to facilitate relatively fast access to a given offer as the need to iterate through potentially all offers meeting certain criteria may be potentially avoided.

In some embodiments, the process 64 further includes receiving a request from a user device for offers, as indicated by block 70. The request may specify criteria for identifying offers, such as categories of offers, search terms for offers, or requests for offers designated as favorites.

Next, the present embodiment includes identifying offers in the offer data store responsive to the user request, as indicated by block 72. Identifying offers in the offer data store may be performed by the above-mentioned controller 14 (FIG. 1) by constructing a query to the offer data store 60 based on a request received from the web server 18 or the API server 16. The query may be transmitted to the offer data store 60, or to the cache server 23, each of which may return responsive records.

Next, the identified offers are transmitted to the user device, as indicated by block 74. Transmitting the identified offers may include transmitting the identified offers in an offer interface, such as a webpage, or an API transmission to a native mobile application, for example by the web server 18, or the API server 16 of FIG. 1, respectively.

The device receiving the identified offers may, in response, perform a process described below with reference to FIG. 3 by which additional offers are requested or an offer is selected and a purchase is executed. This process of FIG. 3 and steps 70 through 74 of FIG. 2 may be repeated numerous times, in some use cases, before advancing to the next steps. Further, the steps 66 through 68 may be repeated numerous times independently of (e.g., concurrent with) the performance of steps 70 through 74 of FIG. 2 (which is not to suggest that other steps described herein may not also be executed independently). That is, the process 64 may undergo step 60 and 68, for example, 50 times within a given time, while performing steps 70 through 74 500 times within that given time, and performing the remaining steps of process 64 a single time.

Figure 3:
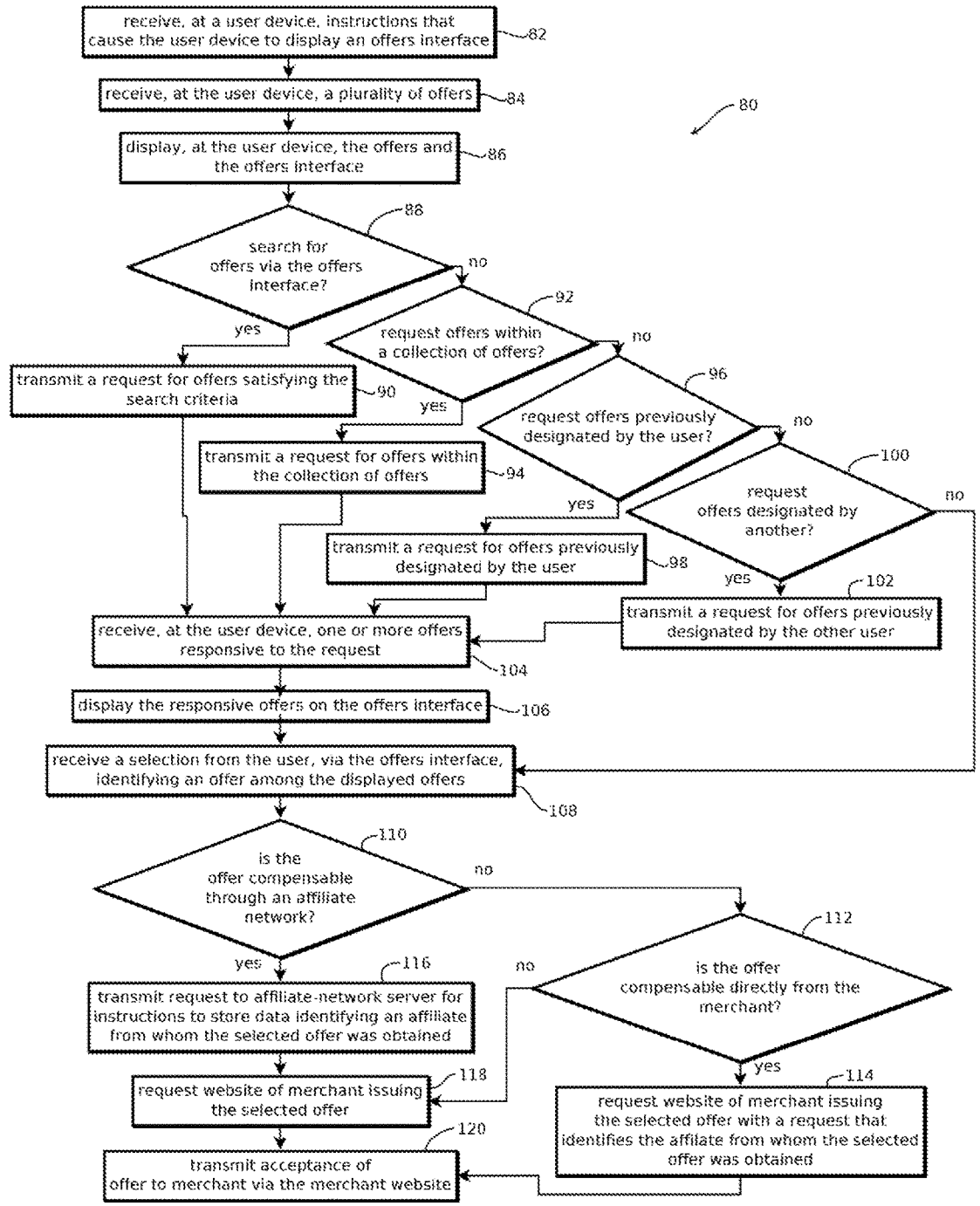
FIG. 3 is a block diagram an example of a process by which a user device in the offer-discovery system of FIG. 1, in some embodiments, obtains and presents to users data related to offers.

In some embodiments, a user device undergoing the process of FIG. 3 may indicate to an offers engine that the user has selected an offer (e.g., by clicking on or touching a selectable element in an offers interface associated with the offer). In response, the offers engine may direct the user device to an affiliate-network server or a merchant server associated with the offer, as illustrated by block 75.

Next, this embodiment of the process 64 includes receiving from merchants or affiliate networks transaction data identifying offers accepted via the user device, as illustrated by block 76. The transaction data may be pulled from these sources, for example, by the ingest module 20 of FIG. 1, periodically, or in response to some threshold number of transactions having occurred.

Next, in this embodiment, the receipt transaction data may be stored in an analytics data store, as indicated by block 78. In some embodiments, this data may be stored in the analytics data store 62 of FIG. 1. Storing the transaction data is expected to facilitate the identification of attributes of relatively profitable offers, as the transaction data indicates which offers historically yielded compensable transactions. Further, storing the transaction data is expected to facilitate relatively accurate auditing of payments from merchants or affiliate networks.

FIG. 3 is a flowchart of an embodiment of a process 80 that provides an example of an offer interface at a user device. The process 80 may be performed by the above-mentioned native application 52 or web browser 50 or 54 in cooperation with the offers engine 12.

Some embodiments of process 80 begin with receiving, at a user device, instructions that cause the user device to display an offers interface, as indicated by block 82. The received instructions may be in the form of a downloaded native application, such as one downloaded from an application store hosted by a provider of mobile devices, or the received instructions may be in the form of a website received from the offers engine 12 and rendered in a browser of the user device.

In some embodiments, the process 80 further includes receiving, at the user device, a plurality of offers, as indicated by block 84, and displaying, at the user device, the offers in the offer interface, as indicated by block 86. The offers may be received at approximately the same time the instructions of step 82 are received, for example along with a webpage, or the offers may be received at a later date, for example during a session subsequent to downloading the native application.

The offers interface may include inputs by which the user may search, filter, or otherwise browse offers having various attributes. Some of these interfaces are described below with reference to steps performed to determine whether the user has engaged these inputs. In some embodiments, determining whether the user has engaged these inputs may be performed by an event handler executed by the user device, the event handler causing the user device to perform the corresponding, below-described requests to the offers engine 12 based on the type of event, e.g., whether the user touched, clicked, or otherwise selected a particular button on the offers interface.

Illustrated process 80 includes determining whether the user is searching for offers, as indicated by block 88. With the offers interface, the user may express their intention to search for offers by entering search terms in a text entry box and selecting a button to request a search in accordance with the entered search term. Upon selecting this button, the user device may transmit a request for offers satisfying the entered search criteria, as indicated by block 90. The transmitted request may be in the form of a GET request or an API call to the web server 18 or the API server 16 of the offers engine 12 of FIG. 1.

In some embodiments, the process 80 further includes determining whether the user requests offers within a collection of offers, as indicated by block 92. The offers interface may include selectable inputs that identify the collections, such as clickable collection names, collection selection buttons, or collection selection tabs. Examples of collections include categories of goods or services, such as sporting goods, house-wares, groceries, and the like; collections of modes of coupon redemption, such as in-store coupon redemption and online coupon redemption; collections based on offer statistics, such as newest offers, most popular offers, highest ranked offers; collections of offers designated by a user or other users; or collections based the value conferred by the offer, such as discounts, free shipping, rebates, and referral fees. Upon determining that the user has requested offers within a collection, the user device may transmit a request for offers within the collection to the offers engine 12, as indicated by block 94, which may return data responsive to the request.

In some embodiments, the process 80 includes determining whether the user requests offers previously designated by the user, as indicated by block 96. In some embodiments, the offers interface may include an input by which a user can designate an offer, such as designating offers as being a user favorite, designating offers as being ranked in a particular fashion, or designating offers as likely being of interest to some other user, such as users adjacent one another in a social graph. The offers interface may include an input for a user to make designations, such as a user selectable input labeled "add to my favorites," or "add to my wallet," and an input for a user to request offers having a designation, such as a user selectable input labeled "view my favorites," or "view my wallet." Upon determining that the user made such a request, the process 80 includes transmitting a request for the offers previously designated by the user, as indicated by block 88. The transmission may be made to the offers engine 12, to the API server 16 or the web server 18, as described above with reference to FIG. 1, and may include an identification of the designation and the user.

The process 80, in some embodiments, further includes determining whether the user requests offers previously designated by another user, as indicated by block 100. The offers interface, in some embodiments, may include an input by which a user makes such a request, such as a user selectable input labeled "offers recommended by my friends." Upon determining that the user has made such a request, the process 80 transmits a request for offers previously designated by the other user (or users), as indicated by block 102. Again, the transmission may be to the offers engine 12 of FIG. 1, which may store or otherwise have access to offers designated by other users and a social graph of the user by which responsive offers are identified. Further, the offers interface may include an input by which the user may view identifiers of other users and add the other users to an offer-interest graph of the user. This offer interest graph may be referenced by the offers engine 12 to identify offers in response to the request of step 102.

The process 80 further includes, in some embodiments, receiving, at the user device, one or more offers responsive to the request, as indicated by block 104, and displaying the responsive offers on the offers interface, as indicated by block 106.

In some embodiments and some use cases, a selection from the user is received via the offers interface, thereby identifying an offer among the displayed offers, as indicated by block 108. In some embodiments, each of the offers may be displayed with an associated input by which the user selects the offer, such as a touchable or clickable button, region, or text. The selection, in some embodiments, may cause the offers interface to request additional data from the offers engine, such as instructions from the offers engine to navigate to an affiliate-network server associated with the offer or to navigate to a merchant server associated with the offer. In other embodiments, such instructions may be present within the offers interface, e.g., in the form of URLs linking to these servers.

The process 80 further includes determining whether the selected offer is compensable through an affiliate network, as indicated by block 110. This determination may be made by the offers engine 12, in some embodiments, for each of the offers being displayed prior to transmission of the offers to the user device. For example, each offer may be associated with a designation indicating whether the offer is compensable in this fashion, and the designation may be transmitted along with the offer, for instance, by associating the offer with HTML or JavaScript™ that so designate the offer, or by including a field including the designation in a response to an API call for each offer. The user device, in some embodiments, may take different actions depending on the designation associated with the selected offer.

Upon determining that the selected offer is not compensable through an affiliate network, the process 80 of this embodiment includes determining whether the selected offer is compensable directly from the merchant associated with the offer, as indicated by block 112. Again, the determination of block 112 may be performed, in some embodiments, by the offers engine 12 for each of the offers being displayed prior to transmission of the displayed offers, and each displayed offer may be associated with a designation based on the results of the determination, such as different HTML or JavaScript™ or a different field value in an API response. The user device may take different actions depending on this designation.

Upon determining that the selected offer is not compensable directly from the merchant, the process 80 may proceed to block 118 described below. Upon determining that the selected offer is compensable, the process 80, in this embodiment, may proceed to request the website of the merchant issuing the selected offer with a request that identifies the affiliate from whom the selected offer was obtained, as indicated by block 114. The request may be in the form of a URL having as a parameter an identifier of the entity operating the offer engine 12, thereby indicating to the merchant that the affiliate should be compensated in accordance with an arrangement between the merchant and the affiliate. Upon performance of step 114, the process 80 of the present embodiment proceeds to step 120 described below.

As indicated by block 110, upon determining that the selected offer is compensable through an affiliate network, the process 80 proceeds to transmit a request to the affiliate-network server for instructions to store data identifying an affiliate from whom the selected offer was obtained, as indicated by block 116. This request may be a request for content from the affiliate-network server that is not displayed to the user, or is not displayed to the user for an appreciable amount of time (e.g., less than 500 ms), and the request may include an identifier of the affiliate, the merchant, and the offer. The requested content may cause the user device to store in persistent memory of the browser of the user device (e.g., memory that lasts between sessions, such as a cookie or a database of the browser) an identifier of the affiliate operating the offers engine 12. This value may be retrieved later by the affiliate-network at the instruction of the merchant upon the user accepting the offer, for example by the user using a coupon code associated with the offer at the merchant, thereby allowing the merchant (or the affiliate network) to identify the appropriate party to compensate for the sale. The coupon code may be a relatively short text string (e.g., shorter than 25 characters or 5 words) selected to be both distinct and memorable to users. In some cases, an image or other visibly distinctive user-manipulable body of data serves the role of the coupon code.

Upon transmitting the request the affiliate network server, the process 80 further includes requesting the website of the merchant issuing the selected offer, as indicated by block 118, and transmitting acceptance of the offer to the merchant via the merchant's website, as indicated by block 120. Accepting the offer, as noted above, may cause the merchant to compensate the affiliate operating the offers engine 12.

The process 80 of FIG. 3 is expected to facilitate relatively fast access to offers that are likely to be relevant to a user, as each of the determinations of step 88, 92, 96, and 100 provide different paths by which the user can specify offers in which the user is likely to be interested. Further, the determinations of step 110 and 112 provide dual mechanisms by which the operator of the offers engine 12 can be compensated, thereby potentially increasing revenue.

In some embodiments, as described further below, a website from the offers engine 12 (referred to as an offers website, but which is not limited to websites) that provides offers to users may include functionality to enable users to redeem certain types of offers, e.g., online coupons. In such embodiments, the offers engine 12 may provide a redemption header (also referred to as a "traveling header") in a merchant web site for easier and faster redemption of online coupons and elimination or reduction of complicated user actions needed to redeem the online coupons. The header may be characterized as "traveling" in the sense that it is presented in or with webpages from two or more domains, and as the header travels, it may carry data from a domain having offers data (e.g., coupon codes in the offers engine website) to a domain in which the offers data is used to redeem the offer (e.g., a merchant website), thereby relieving the user of the burden of retaining and recalling this information. Accordingly, the redemption header may result in increased rates of coupon redemption and increased sales for merchants offering online coupons provided by the offers engine. Embodiments, however, are not limited to systems that provide these benefits, and some embodiments may provide other benefits, as various engineering and cost tradeoffs are envisioned.

As explained below, the redemption header may be provided in merchant websites provided from merchant servers 38 to enable a user to easily view offer information after leaving the offers website from the offers engine 12 (FIG. 1). The header may be provided by the merchant server in the sense that the merchant server stores and sends the instructions and resources by which the header is rendered or in the sense that the merchant server sends instructions directing a web browser to retrieve these instructions and resources from another server, e.g., a GET request to a network address of the offers engine of FIG. 1 or a content delivery network.

FIGS. 4A-4E depict screens of a browser executing on a user device, such as mobile user device 28, desktop user device 32, and other devices, illustrating the redemption of an offer, e.g., an online coupon, and a redemption header in accordance with an embodiment of the present invention. Although the redemption header described below is illustrated and referred to as "header," it should be appreciated that other embodiments may include a redemption bar provided at any location of a merchant webpage (e.g., a redemption footer). Thus, other embodiments having a redemption bar similar to the redemption header but in a different location may be provided in the manner described below. The shape of the redemption bar is not limited to "bars," e.g., generally rectangular display elements that horizontally span a webpage, and may include other forms of presentation, e.g., an overlaid box.

Figure 4A:
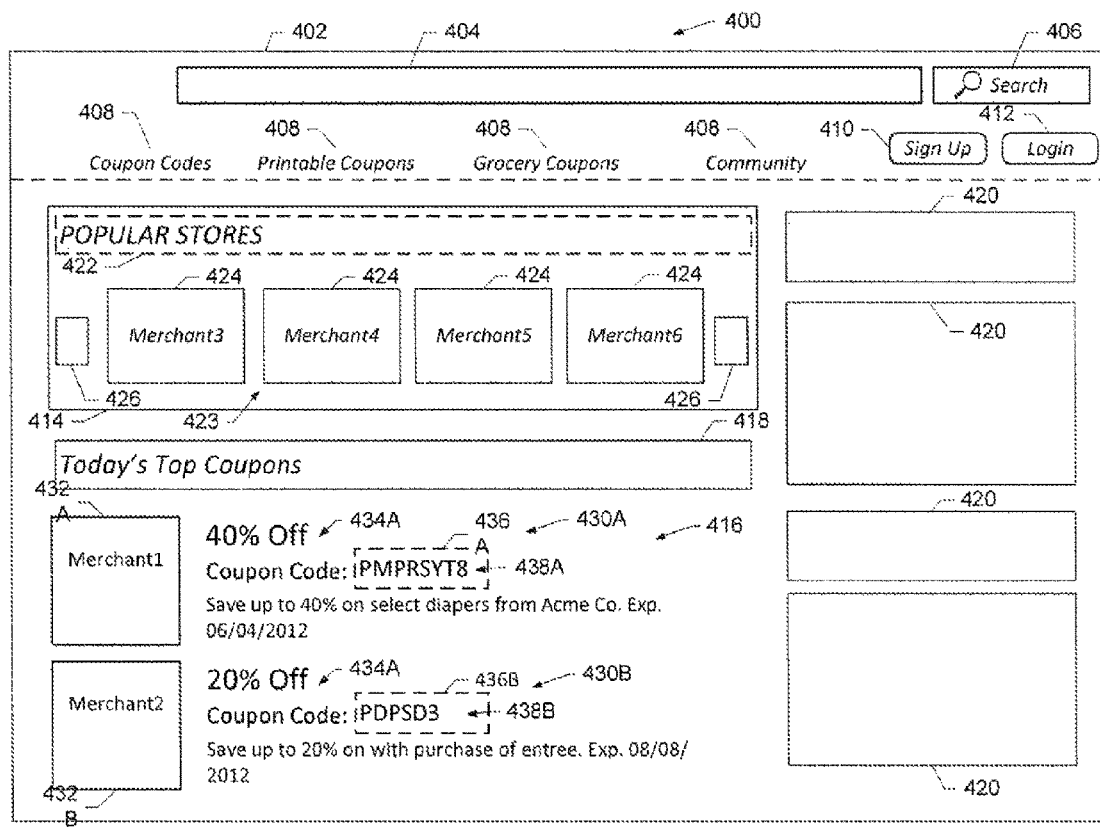
FIGS. 4A-4F are schematic diagrams illustrating screens of a user device executing a browser in accordance with an embodiment of the present invention.

FIG. 4A depicts a screen 400 of a web browser, e.g., an application for receiving, rendering, interaction with, and viewing web content in accordance with an embodiment of the present invention. As will be appreciated, the screen 400 and other screens described below may be presented in a display of a user device that may receive inputs from a user and provide outputs on the display. In some embodiments, inputs may be received from a keyboard, a pointing device (e.g., a mouse) or other input device. In some embodiments, a user interface may include a touchscreen, software modules, or any combination thereof, and inputs may be received as touches on the touchscreen, such as from a digit of a user, a stylus, etc. The screen 400 depicts an offers webpage 402 (a term which includes web apps having a document object model dynamically constructed client-side with AJAX requests) provided by the offers engine 12. The webpage 402 may include various elements to display information to a user, and in some instances, receive user input. For example, the webpage 402 may include a search field 404, a search control 406, navigation tabs 408, a sign-up control 410 and login control 412. Additionally, the webpage 402 may include other elements, such as a store panel 414, an offers area 416 having a title 418, and various other elements 420.

The search field 404 may enable a user to enter a search query and execute a search by selecting the search control 406 (e.g., a search button). The search may include searches for offers, categories of offers, merchants, or any other suitable search queries. The navigation tabs 408 may enable a user to navigate to different sections of an offers website, such as by selecting (e.g., clicking) one of the navigation tabs 408. For example, as shown in FIG. 4A, the navigation tabs 408 may include, for example, a "Coupon Codes" tab, a "Printable Coupons" tab, a "Grocery Coupons" tab, a "Community" tab, and so on. The sign-up control 410, e.g., the illustrated "Sign-Up" button, may enable a user to create a user profile with the offers engine 12 for customizing the content provided by the offers engine 12. Accordingly, the login control 412 (e.g., the illustrated "Login" button) may enable a user having a user profile with the offers engine 12 to login and retrieve customizations and other profile attributes.

The merchant panel 414 may include a title 422 (e.g., "Popular Stores") and a carousel 423 or other visual element that displays selectable merchant tiles 424 (e.g., "Merchant3", "Merchant4", "Merchant5", and "Merchant6"). The merchant tiles 424 may each display text, images (e.g., a logo), or both associated with a merchant. A user may select one of the merchant tiles 424 to select a merchant and display offers associated with the selected merchant in the offers area 416. Additionally, a user may scroll the carousel 423 by selecting (e.g., clicking) the scroll controls 426 to scroll through the merchant tiles 424 and view other merchants. The other elements 420 may include selectable advertisements, links to social networking integration (e.g., a "Like" button, a "+1" button, etc.), links to other sections of the offers website, links to regional versions of the offers website, input fields for submission of user information (e.g., email addresses), and so on.

The offers area 416 may present offers, e.g., online coupons 430, for viewing and selection by a user. The offers area 416 may include any number of offers associated with merchants providing goods, services, or a combination thereof. The offers area 416 may present offers based on ranking criteria, user selections (e.g., selections of a merchant, offer categories, etc.) or other parameters. For example, as shown in FIG. 4A, the offers area 416 depicts top ranked offers as indicated by the "Today's Top Coupons" text displayed in the title 418. Each coupon 430 may be presented with information associated with the coupon 430, such as a merchant tile 432 and a descriptive text 434. Additionally, each coupon 430 may include a coupon code box 436 having an offer redemption identifier, e.g., a coupon code 438, associated with each coupon 430. The coupon code 438 may be displayed in the coupon code box 436 or other visual element, such as a circle, balloon, etc. As described in detail below, upon selection of one of the coupons 430, the coupon code of a selected coupon may be conveyed to and displayed in a redemption header in a merchant website. The offer redemption identifier may also include, for example, discount descriptions (e.g., "50% off of all sweatshirts"), rebate instructions (e.g., "Receive $20 rebate when purchasing a flash drive from Merchant1"), identifiers of free goods or services (e.g., "Free tokens with the order of any large pizza"), or any other identifier associated with an offer that enables or describes the redemption of the offer to a user. Other offer redemption identifiers may be displayed in a box or other visual element in the offers area 416.

The merchant tile 432 may include a text, image (e.g., a merchant logo), or combination thereof identifying the merchant associated with the coupon. The descriptive text 434 may include information about the coupon, such as the goods, services, or both associated with the coupon, the discount or other offer provided by the coupon, the expiration date, or any other suitable information or combination thereof. For example, as shown in FIG. 4A, a first online coupon 430A may be presented with a merchant graphic 432A (e.g., "Merchant1") and descriptive text 434A (e.g., "40% Off Save up to 40% on select diapers from Acme Co. Exp. Jun. 4, 2012). Additionally, the first online coupon 430A includes a coupon box 436A having a coupon code 438A ("PMPRSYT8") associated with the coupon 430A. The other coupon 430B illustrated in FIG. 4A may include similar information, such as merchant tile 432B, descriptive text 434B, coupon code box 436B, and so on.

To use a coupon, a user may select (e.g., touch, click, etc.) one of the online coupons 430. For example, a user may select any portion of the coupon 430A, such as the merchant tile 432A, the descriptive text 434A, the coupon code box 436A, etc. As described below, upon selection of a coupon, the browser executing on the user device may be redirected to the merchant website associated with the selected coupon. For example, the merchant website may be presented in an existing window of the browser, in a new window of the browser, in a new tab of the browser, or via other functions of the browser. Additionally, upon selection of a coupon, a value of the coupon code may be copied to a clipboard or other temporary storage. For example, upon selection of the coupon 430A, the value of the coupon code 438A ("PMPRSYT8") may be copied to a clipboard. The interactions described herein may be implemented with an event handler conveyed in instructions, such as JavaScript™, from the offers engine of FIG. 1 and executed by the web browser. Such instructions may include a mapping of events, e.g., onclick, ontouch, and the like, to JavaScript™ functions (also provided by the offers engine) that implement the corresponding functionality upon occurrence of the corresponding event. In some cases, a browser add-on, such as Adobe Flash Player™ or other multimedia player having elevated security privileges relative to the browser, is used to access the temporary storage. Or (i.e., and/or) the coupon code may be stored in a subsequently created document object model (DOM) element of a traveling header.

Figure 4B:
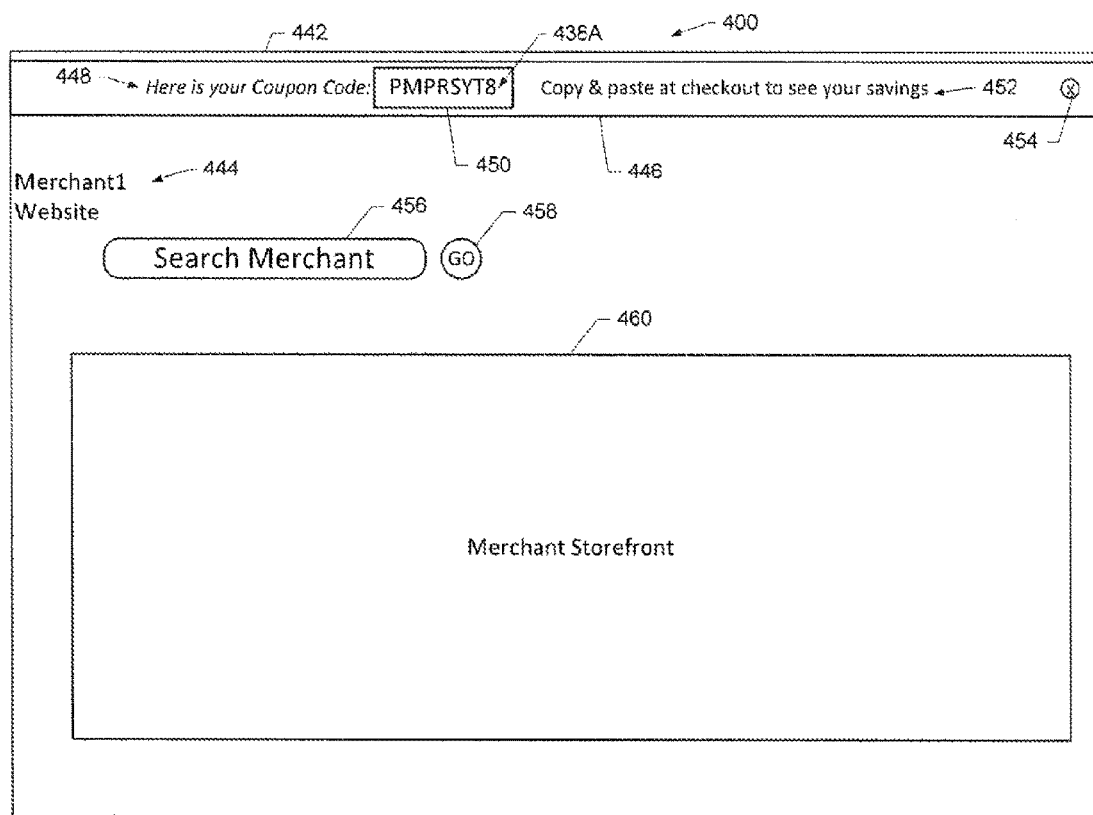

FIG. 4B depicts another screen 440 of a browser in accordance with an embodiment of the present invention. The screen 440 displays a merchant webpage 442 of a merchant website 444 that may be presented in response to a user selection of an online coupon, such as a selection of the online coupon 430A depicted in FIG. 4A. To this end, at the selection interface element for a given offer, the web content from the offers engine (e.g., HTML, CSS, images, and JavaScript™) may include a link to the merchant's website or an affiliate network server that redirects to the merchant's website. Accordingly, after a user selects an online coupon from the offers webpage 402, the merchant website 444 may be presented in the browser to enable a user to redeem the selected coupon. As described in detail below, a redemption header 446 may be added to the merchant website 442 to display the offer redemption identifier associated with the selected offer and text (e.g., instructions) associated with redemption of the selected offer. Additionally, the redemption header 446 may be retrieved asynchronously relative to loading of the merchant webpage 442, as described below with reference to FIG. 6. For example, web content for rendering the header 446 may be requested from one server, such as the offer's engine of FIG. 1, while the rest of the webpage is being requested from a merchant server and rendered. Thus, when a user selects the selected coupon 430A, the merchant webpage 442 may load in the browser without interruption by the retrieval of the redemption header 446.

It should be appreciated that the merchant website 444 may include any number and type of webpages. For example, the merchant webpage 442 may include a landing page, a storefront webpage, a product webpage, and other webpages. Additionally, the merchant website 444 may be provided via different types of domains associated with a merchant, such as a parent domain associated with the merchant, subdomains of the parent domain, an mdot domain (i.e., "m.") associated with the merchant, and so on.

The redemption header 446 may be provided in the merchant webpage 442, as described in FIGS. 5, 6A, and 6B below, and may remain on the other webpages of the merchant website 444 as a user navigates the website 444. Thus, the redemption header "travels" from the offers webpage to the merchant webpage 442 and other webpages of the merchant website. By retaining the redemption header 446, a user may have access to the coupon code 438A required to redeem the coupon 430A and instructions and other text associated with the selected coupon 430A. As shown in FIG. 4B, the redemption header 446 may include descriptive text 448, a coupon code box 450, instructions 452, and a close control 454 (e.g., a close button). The descriptive text 448 may describe the contents, function, or both of the redemption header 446. For example, the descriptive text 448 may include the text "Here is your Coupon Code" describing the contents of the coupon code box 450 presented in the bar 446. Accordingly, the coupon code box 450 may include the coupon code 438A associated with the selected coupon 430A. Additionally, the instructions 452 may provide instructions to the user on how to use the coupon code 438A and redeem the selected coupon 430A. For example, as shown in FIG. 4B, the instructions include the text "Copy & paste at checkout to see your savings." Displaying the coupon code adjacent or in the merchant website may facilitate copying and pasting even if the browser does not have access to clipboard memory, e.g., if an Adobe Flash browser plug-in is disabled or absent, as the user may highlight, copy, and paste the code manually, accessing the clipboard memory, from within the same visual context, e.g., without switching to another window, tab, or website, or writing down the code and typing it.

The merchant website 444 may include a variety of web content that enables a user to search or browse for goods, services, or both and select and order such goods and services. As shown in FIG. 4B, for example, web content of the merchant website 444 may include a search field 456, search button 458, and a merchant storefront 460. It should be appreciated that the web content depicted in FIG. 4B is merely an example and merchant websites may include a wide variety of web content, designs, and functionality. Such functionality may include, for example, the ability to search the merchant website 444 by entering a search query into the search field 456 and selecting (e.g., touching, clicking, etc.) the search button 458. Additionally, the merchant storefront 460 may display goods, services, or both offered by the merchant and available for order by a user. In some embodiments, a user may use the search field 456 to find the goods, services, or both associated with the selected coupon. In other embodiments, the goods or services may be presented to the user in the merchant storefront 460 based on the selected coupon 430A.

Figure 4C:
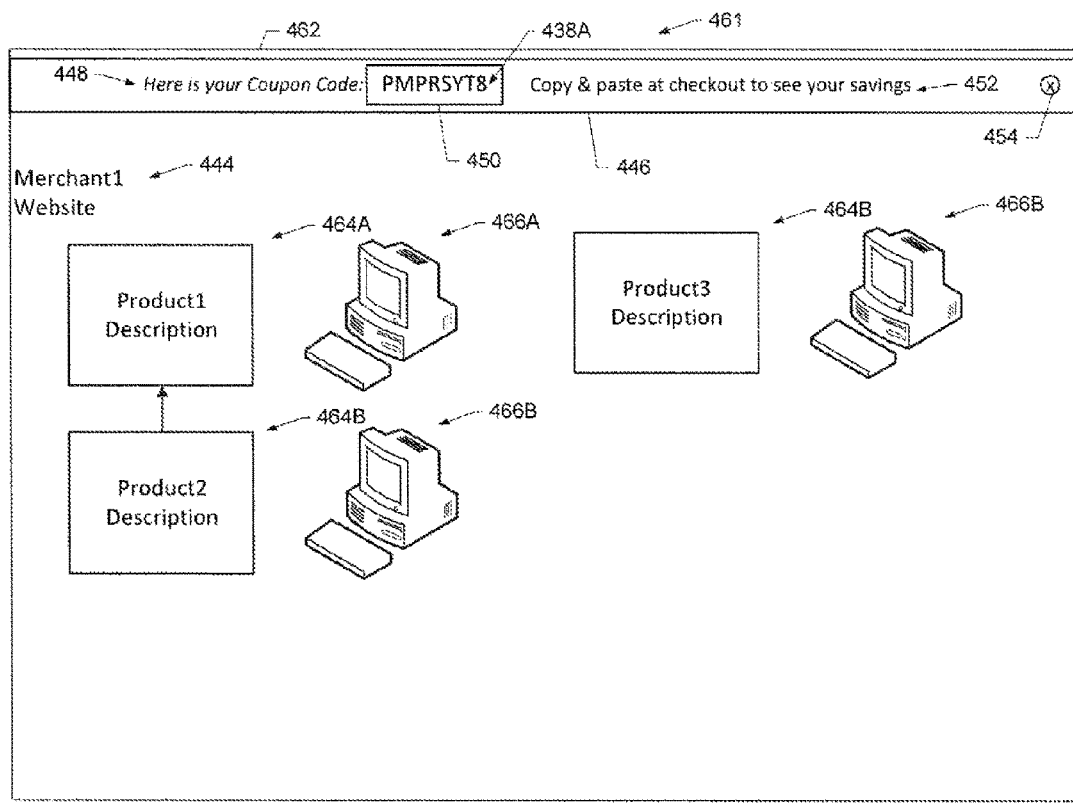

As mentioned above, a user may navigate the merchant website 444 by selecting the search button 458, selecting links in the merchant storefront 460, and so on. In response, various webpages of the merchant website may be requested and displayed by the web browser. The redemption header 446 may remain in such webpages until the user selects the close button 454, which may be mapped by an event handler of the website to a JavaScript™ function that removes an element of the document object model corresponding to the redemption header. Thus, regardless of the portion of the merchant website 444 displayed by the web browser, in some embodiments, the redemption header 446 (and coupon code 438A) may remain accessible (e.g., visible and retrievable via a copy command) to the user. For example, FIG. 4C depicts another screen 461 of a browser illustrating a webpage 462 of the merchant website 444 in accordance with an embodiment of the present invention. As shown in FIG. 4C, the webpage 462 of the merchant website 444 may include a product listing having product text 464 and product images 466. For example, the webpage 462 may include product text 464A and product image 466A associated with a first product, product text 464B and product image 466B associated with a second product, and so on. A user may navigate to the webpage 462 by searching for a product, selecting links in the merchant storefront 460, or other navigation actions within the merchant website 444. Moreover, as shown in FIG. 4C, the redemption header 446 remains (i.e., travels) in the webpage 462 through a sequence of merchant webpages. Thus, while a user is viewing various products on the webpage 462, the redemption header 446 may remain to allow access to the information associated with the selected coupon.

Figure 4D:
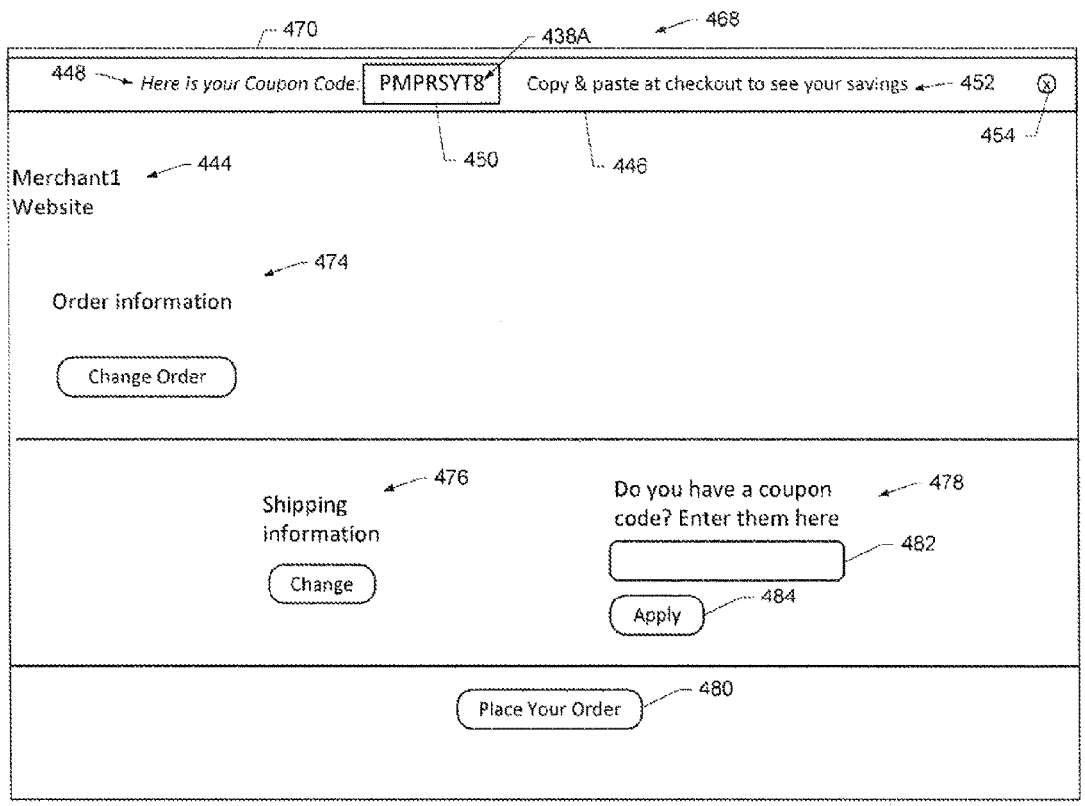

As described above, a user may use the merchant website to order goods and services associated with the selected coupon, such as by adding the goods and services to a virtual "shopping cart" and selecting an option to checkout. FIG. 4D depicts a screen 468 of the browser illustrating a checkout page 470 of the merchant web site 444 in accordance with an embodiment of the present invention. As described above, web content such as the checkout page 470 may be retrieved from the Internet via a network accessible by a user device executing the browser, and this web content may be displayed by browser. As shown in FIG. 4D, the redemption header 446 remains in the checkout webpage 470 and includes the coupon code box 450 and the coupon code 438A. The redemption header 446 may remain accessible while a user completes a transaction, e.g., an order for goods, services, or both with the merchant. Here again, a user may remove the redemption header 446 by selecting the close control 454. In some cases, the header is only shown at the check-out page, or the header may be displayed in the preceding webpages, e.g., while the user shops to serve as a reminder of a discount while the user makes purchasing decisions.

The merchant checkout page may include various web content that enables a user to view and enter order information and complete an order for goods, services, or both. For example, the merchant checkout page 470 may include an order information portion 474, a shipping information portion 476, a code entry portion 478, and a checkout button 480. The order information portion 474 enables a user to enter a shipping address, a billing address, payment information, and the like. By selecting the checkout out button 480 ("Place Your Order"), a user may submit an order for fulfillment by the merchant. The order information portion 474 may include order information, such as products or services in the order, quantities, prices, payment information, etc., and may include a button or other control for changing the order. Similarly, the shipping information portion 476 may include shipping address, a billing address, and other shipping information and may include a button or other control to enable a user to change the shipping information. The code entry portion 478 may enable a user to enter coupon codes, promotional codes, gift card codes, or any other codes that may be applied to an order. The code entry portion 478 may include an input field 482 (e.g., a text field that receives text input) and a submission button 484 ("Apply"). By entering a coupon code or other code into the input field 482 and selecting the submission button 484, a user may submit a coupon code to apply a coupon associated with the merchant. In some embodiments, the input field 482 may accept images or other input.

Figure 4E:
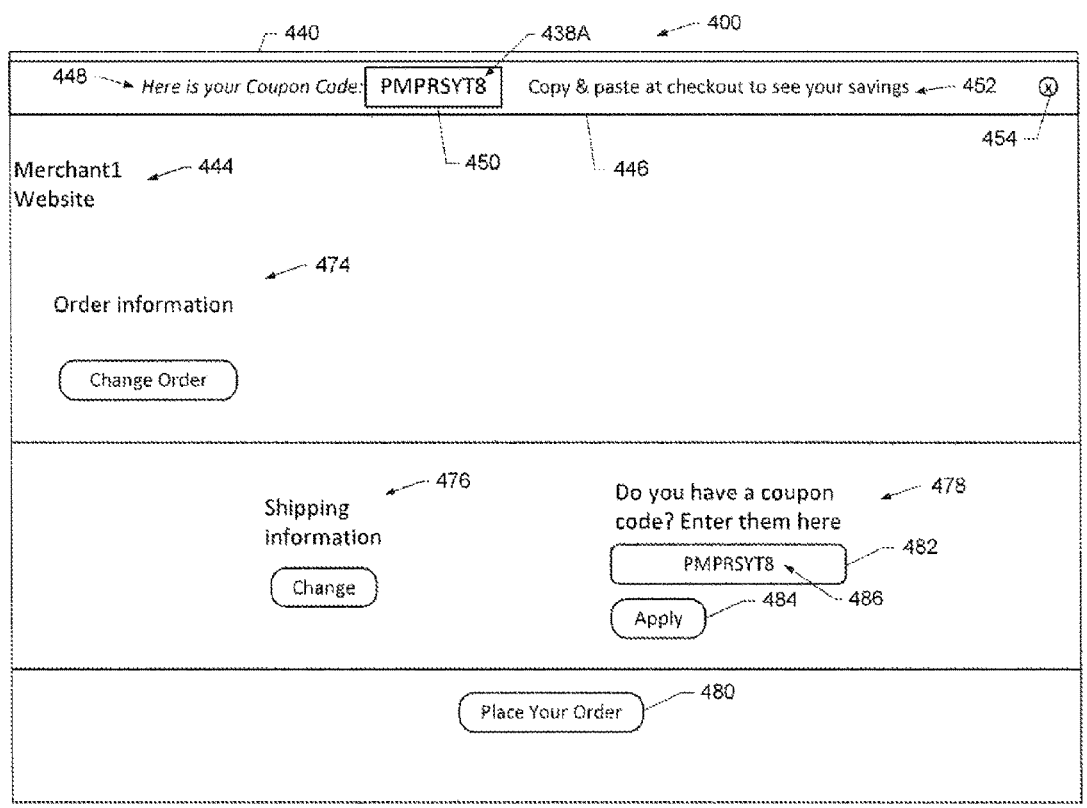

As shown below in FIG. 4E, a user may enter the value associated with the coupon code into the input field 482 by pasting a value of the coupon code 438A from the clipboard into the input field 482. FIG. 4E further depicts the screen 468 and the checkout page 470 illustrating entry of a coupon code value 486 in the input field in accordance with an embodiment of the present invention. As mentioned above, a value corresponding to the coupon code 438A may be copied to a clipboard or other temporary storage upon selection of the selected coupon. Thus, a user may simply paste the contents of the clipboard into the input field 482 to enter the coupon code value 486 into the input field 482, and a user does not need to memorize the coupon code or manually type the code directly into the input field 482. Alternatively, a user may type or otherwise enter the coupon code value 486 into the input field 482 and may easily obtain the coupon code from the redemption header 446 included in the checkout webpage 470. In other embodiments, the input field 482 may be automatically populated ("auto-populated") with the coupon code value 486. For example, the code (e.g., JavaScript™) associated with the redemption header 446 may detect the input field 482 when the code is executed as the redemption bar 446 is loaded, and the coupon code value 486 may be automatically entered into the input field 482. Or the code may be loaded by such a script in response to a click event on an apply-coupon button of the header or a click even on the coupon code. In some cases, the header is reloaded with each merchant web page, or executes a script with each loaded merchant web page to determine whether the web page is a checkout webpage in which the code may be applied, e.g., by detecting the presence of keywords, such as "shipping information," or "checkout," in the webpage or a portion of a URL of the webpage know to correspond with the merchant's checkout webpage.

In some embodiments, a <div> tag of other element including the input field 482 may be detected to detect the input field 482, such as an input element of type text within an HTML form element of a div box containing the string "coupon" or related keywords. In some cases, other content may be conveyed and entered via the header content. For instance, user shipping addresses, billing information, and the like may be retrieved from a user profile of the offers engine, stored in non-visible content of the header (e.g., a JavaScript™ variable), and entered by a script of the header in response to a request from the user, e.g., in response to a user clicking an auto-populate button. In yet other embodiments, a merchant may specifically identify the webpage element of the input field 482 or may identify the input field 482 using a standardized identification. In some embodiments, a checkout-page identifier (e.g., keywords, a URL, or the like) may be stored in association with the merchant by the offers engine above and sent as an variable in the script or other code associated with the header, such that the value can be referenced when a checkout-page detection function is executed in response to a merchant webpage loading.

A user may then select the submission button 484 to apply the coupon code to the order. Thus, the coupon code may be entered into the input field 482 by merely pasting the contents of a clipboard or other temporary storage into the input field 482 or by auto-populating the input field 482. After application of the coupon code 438A, a user may submit the order to the merchant by selecting the checkout button 478.

Although FIGS. 4D and 4E are described with reference to an input field of a checkout webpage associated with a merchant, it should be appreciated that the same techniques may apply to input fields located in any webpage associated with a merchant that may receive a coupon code and for which a user desired to enter the code. For example, a shopping cart webpage, a product webpage, or other merchant webpages may have an input field that may be processed in the manner described above.

Figure 4F:
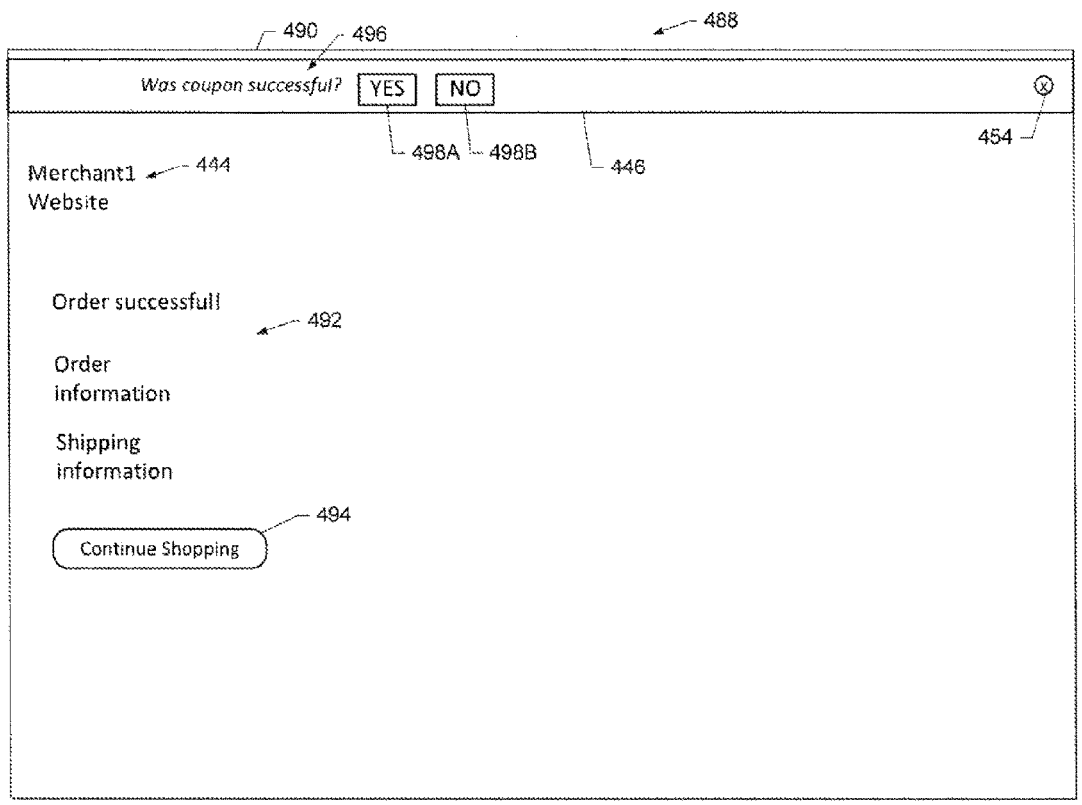

In some embodiments, as shown in FIG. 4F, the redemption header 446 may provide different content in response to changes in the webpage or web content displayed in the browser. For example, after a different merchant webpage loads or web content within a merchant webpage changes, the redemption header 446 may change based on the different webpage or changed web content. An order confirmation page may be detected using techniques like those described above for detecting checkout pages, e.g., executing a page classification script upon loading of each merchant webpage and determining based on keywords or URL attributes associated with the merchant in the header script and offers engine whether the webpage is a checkout page, an order confirmation page, or a shopping page. Upon detecting the order confirmation page, the header of FIG. 4F may be presented. FIG. 4F depicts a screen 488 of a browser illustrating an order confirmation webpage 490 in accordance with an embodiment of the present invention. For example, after a user submits an order, such as from the checkout page 470 depicted in FIG. 4E, a user may be presented with the order confirmation webpage 490. The order confirmation webpage 490 may include order information 492 and a "Continue Shopping" button 494. The order information 492 may include a verification of order submission ("Order successful!"), order information, shipping information, or any other information associated with an order. The "Continue Shopping" button 494 may enable a user to navigate to additional webpages of the merchant website 444, such as by returning to a merchant storefront or a product webpage.

As shown in FIG. 4E, in response to the loading of the order confirmation webpage 490, the redemption header 446 may include different content that may be based on the order confirmation webpage 490. As shown in FIG. 4E, the redemption header 446 may include user feedback instructions 496 ("Was coupon successful?") and feedback buttons 498. A user may indicate the success of the selected coupon by selecting the "YES" feedback button 498A and the failure of the selected coupon by selecting the "NO" feedback button 498B. Upon selection of one of the buttons 498A or 498B, the selection may be transmitted to the offers engine 12, a transmission which includes an identifier of the offer. In this manner, user feedback regarding the success or failure of an online coupon or other offer may be collected and used for offer analysis, offer ranking, affiliate payments, merchant payments, or other purposes. In some embodiments, after a user selects a feedback button 498, the redemption header 446 may be removed from the order confirmation webpage 490, e.g., by a script or code of the header executed in response to a click event on one of the buttons 498A or 498B. In other embodiments, the redemption header 446 may remain on the order confirmation webpage and may again present different content based on user selection of another webpage (e.g., by selecting the "Continue Shopping" button 480).

As mentioned above, in some embodiments, the loading of a different webpage in a browser may be detected. In such an embodiment, for example, the code associated with the redemption header 446 may detect a POST, a GET, or other HTTP request method to detect the loading of a different webpage. Additionally, the data included in the request method may be parsed and analyzed to determine the type of webpage requested. For example, if an order confirmation webpage is detected, e.g., based on a requested URL in a GET request, then in response, the user feedback text 496 and feedback buttons 498 may be provided in the redemption header 446. In other embodiments, the asynchronous loading of different web content in a merchant webpage may be detected. In such an embodiment, the merchant webpage may call a method that provides a message or other indication to the redemption header 446 that different web content is loading. Such a method may be provided in an application programming interface (API) provided by the provider of the offers engine 12.

Figure 5:
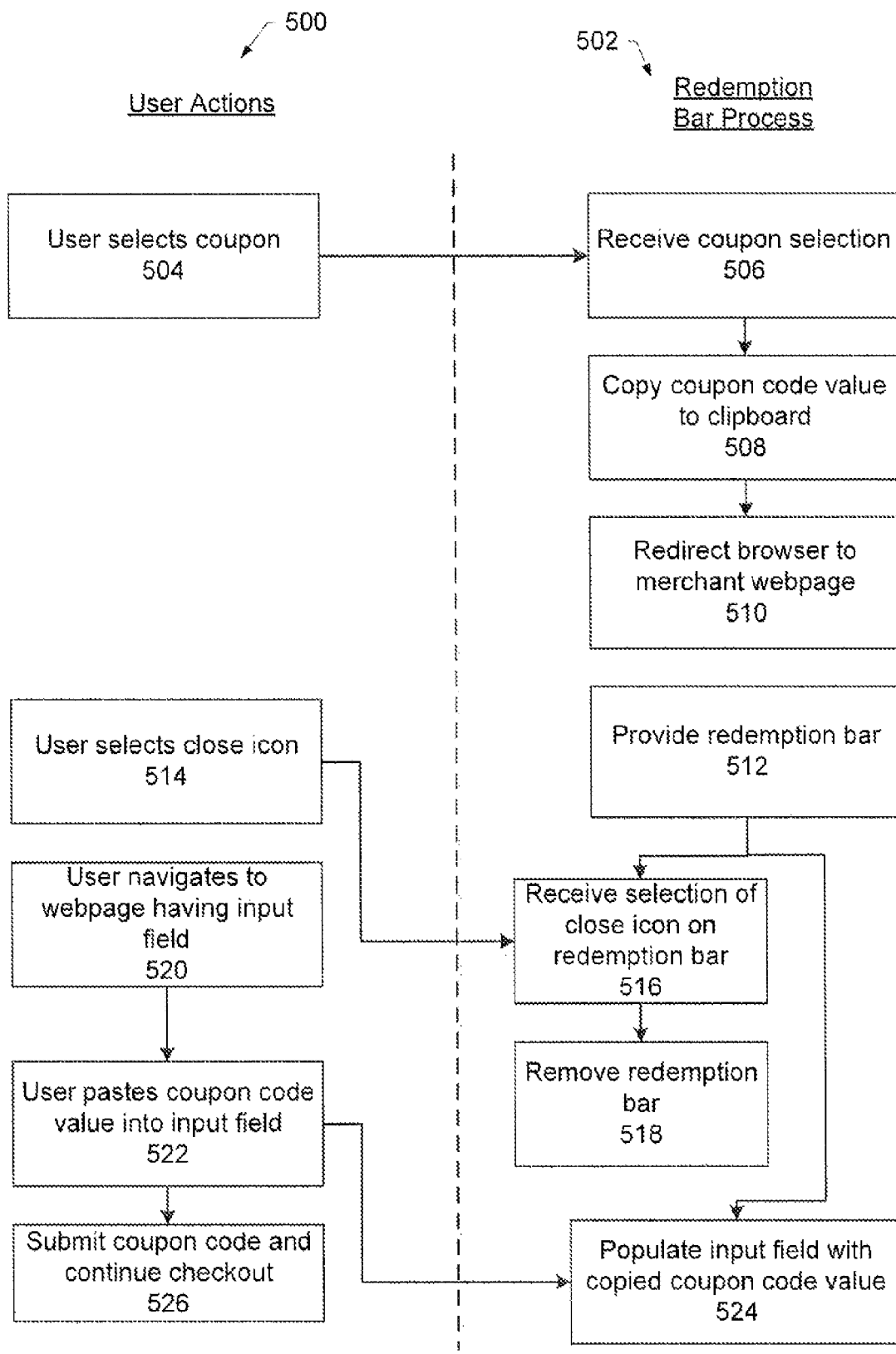
FIG. 5 is a block diagram illustrating user actions and a redemption header process in accordance with an embodiment of the present invention.

FIG. 5 depicts user actions 500 and a redemption header process 502 in accordance with an embodiment of the present invention. Some or all steps of the process portion 502 may be implemented as executable computer code stored on a non-transitory tangible computer-readable storage medium and executed by one or more processors of a special-purpose machine, e.g., a computing device programmed to execute the code. Initially a user may select an offer, e.g., an online coupon, from an offers website displayed in a browser (block 504), such as described above and illustrated in FIG. 4A, and the online coupon selection may be received (block 506). Next, a value corresponding to the offer redemption identifier, e.g., a coupon code, associated with the selected coupon may be copied to a clipboard or other temporary storage (block 508). Additionally, in response to the user selection, the browser may be redirected to a merchant webpage (block 510), such as by providing a merchant webpage in a new tab or window of the browser. For example, as described above, a merchant webpage may be requested from one or more merchant webservers and provided to the browser. As described above and illustrated in FIG. 4B, a redemption header that includes the offer redemption identifier, e.g., a coupon code, may be provided in the merchant webpage (block 512).

A user may then perform other user actions to interact with the redemption header and merchant webpages. For example, a user may select the close control of the redemption header (block 514), and the selection of the close control may be received (block 516). In response, the redemption header may be removed from the merchant webpage (block 518). A user may also search and browse a merchant website to purchase goods, services, or both associated with the coupon. Subsequently, a user may navigate to a merchant webpage having an input field to complete an order for goods, services, or both, such as a checkout webpage, a shopping cart webpage, or other merchant webpage (block 520). A user may then paste a coupon code value from the clipboard or other temporary storage into the input field of the merchant webpage (block 522). As described above and as illustrated in FIG. 4E, the input field may then be populated with the value of the coupon code of the selected coupon (block 524). After the coupon code is entered into the input field, a user may submit the coupon code for redemption and continue the checkout to complete the order (block 526). As described above in FIG. 3, redemption of offers, such as a selected coupon, may occur through an affiliate network or directly from a merchant.

Figure 6A:
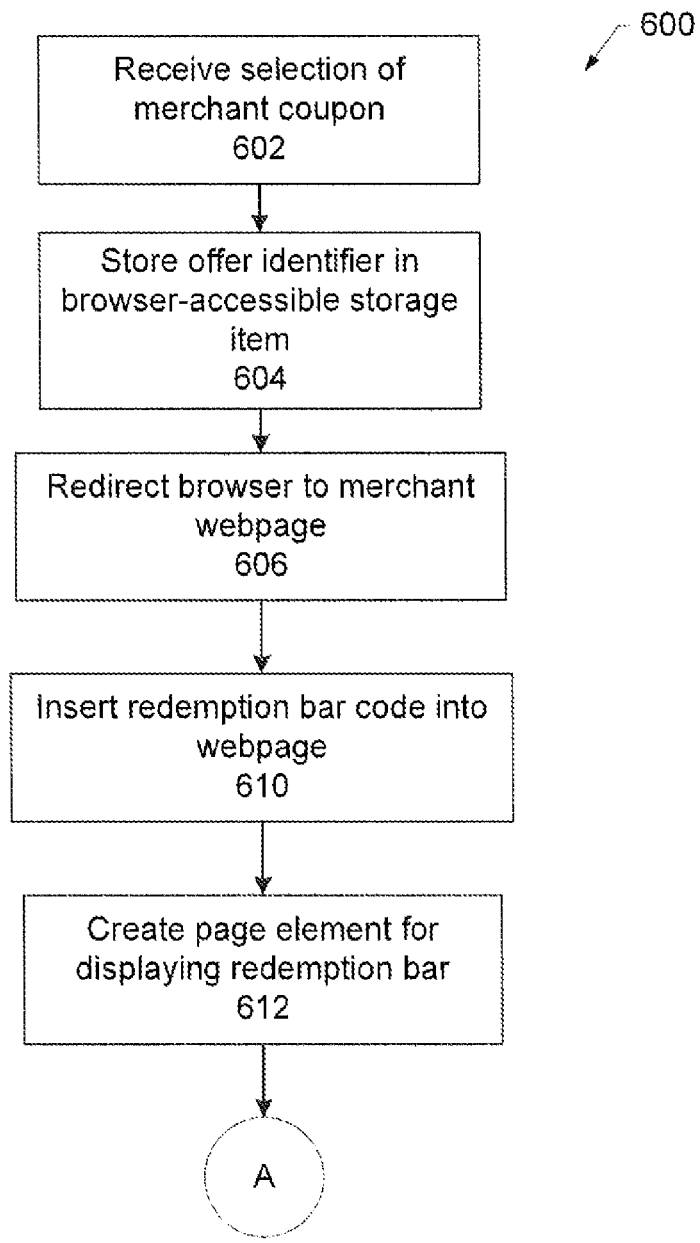
FIGS. 6A and 6B are block diagrams are block diagrams for providing a redemption header in accordance with an embodiment of the present invention.

FIG. 6A depicts a process 600 for providing a redemption header in accordance with an embodiment of the present invention. Some or all steps of the process 600 may be implemented as executable computer code stored on a non-transitory tangible computer-readable storage medium and executed by one or more processors of a special-purpose machine, e.g., a computing device programmed to execute the code. Initially, as described above, a selection of an online coupon from an offers website may be received (block 602). Next, an offer identifier associated with the selected online coupon may be stored in a browser-accessible storage item (e.g., a cookie, a SQLite database, a local Storage object, etc.). In some embodiments, for example, the browser-accessible storage item may be a session cookie that expires when a session ends (e.g., when the browser is shutdown).

As described above and as illustrated in FIG. 4B, the browser may be redirected to a merchant webpage (block 606), such as a landing webpage of a merchant website. For example, the redirect request may request the merchant webpage from merchant servers and the merchant webpage may be provided to the browser from the merchant servers. Next, code for a redemption header may be inserted into the merchant webpage (block 610), and this redemption header code may be executed by the browser during loading of the merchant webpage. In some embodiments, the redemption header code may include JavaScript™ and may be inserted as a HTML <script> tag. In such embodiments, the redemption header code may be inserted asynchronously via JavaScript™ provided by the offers engine 12, such as JavaScript™ provided in the offers web site having the selectable offer. As described above, in some embodiments the offers engine 12 may include a content delivery network (CDN), and the redemption header code and other static content associated with the redemption header may be served via the CDN. Additionally, the size of the redemption header code may be minimized or reduced to optimize or improve the transmission and loading time of the redemption header code.

Next, a webpage element for the redemption header may be created in the merchant webpage (block 612), such as in a document object model (DOM) associated with the merchant webpage. For example, in some embodiments an inline frame may be created via the HTML <iframe> tag. In such embodiments, the redemption header code may load content from the offers engine 12 within the inline frame. Additionally, the redemption header code may use a relatively unique namespace to avoid conflicts with other elements. Thus, in some embodiments, nodes or other elements inserted into the DOM of a merchant webpage may be associated with a unique namespace to eliminate conflicts with existing elements. The process 600 continues in FIG. 6B, as shown by connector block A.

Figure 6B:
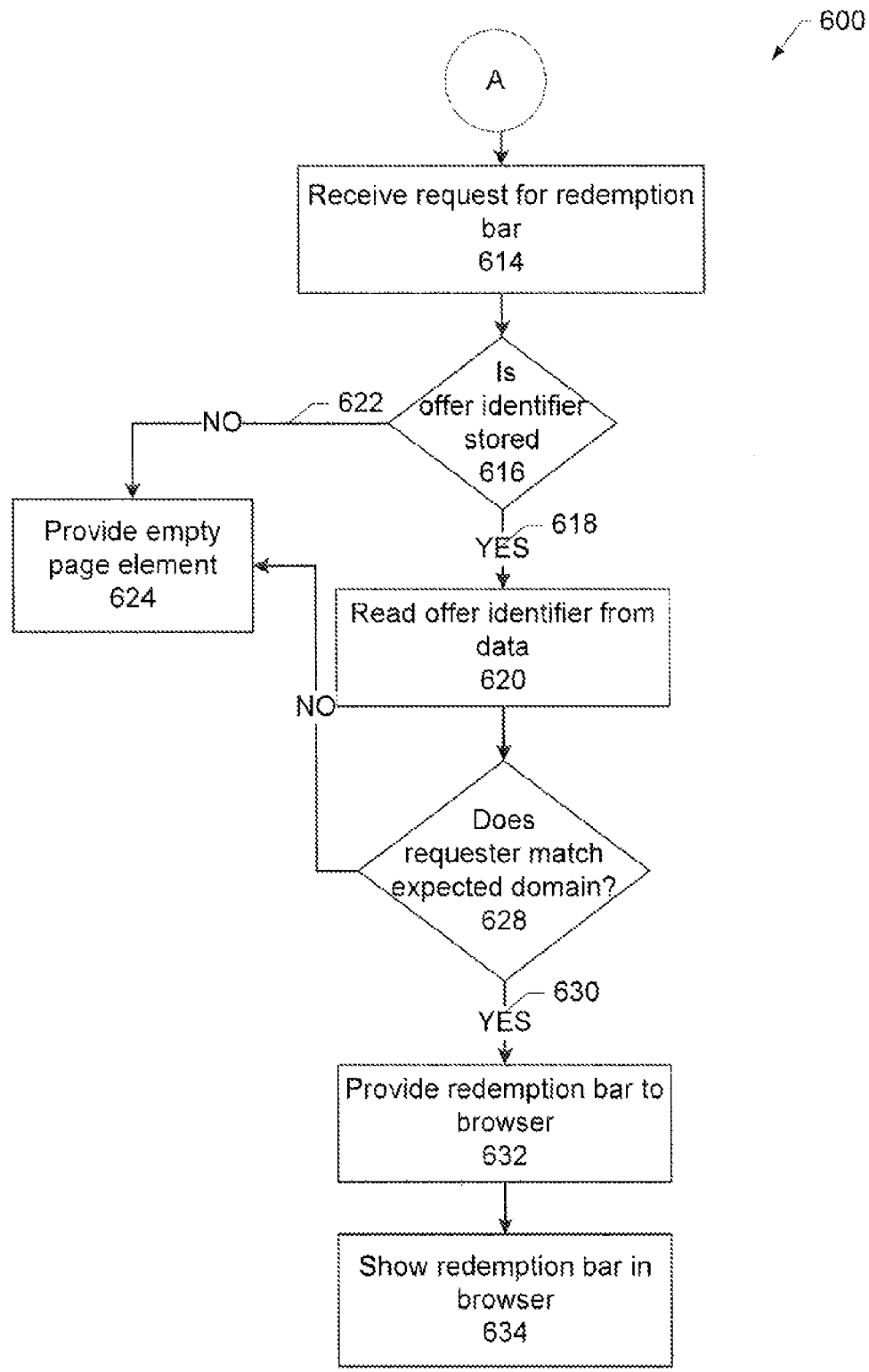

FIG. 6B further depicts the process 600 for generating a redemption header in accordance with an embodiment of the present invention. As shown in FIG. 6B, after creating a webpage element for the redemption header (block 612), a request for the redemption header may be received (block 614), such as from the redemption header code inserted into the merchant webpage. In some embodiments, any parameters provided in the request may be encoded. Next, the existence of the offer identifier in the cookie or other browser-accessible storage item may be determined (decision block 616). If the offer identifier is stored (line 618), then the offer identifier associated with the selected offer may be read (block 620). In contrast, if the offer identifier is not stored (line 622), then an empty webpage element may be provided, e.g., no content is provided for display in the webpage elements (block 624). In other embodiments, a message may be provided to remove the webpage element (e.g., an inline frame) created for the redemption header. Accordingly, the redemption header may not be included in the merchant webpage (and is not displayed by the browser).

After reading the offer identifier, the requester of the redemption header may be compared to an expected domain to determine if the requester matches the expected domain (block 628). For example, the domain of the merchant website requesting the redemption header may be compared to the expected merchant domain associated with the offer identifier for the offer. If there is a match between the requester and the expected domain (line 630), then the redemption header may be provided to the browser (block 632). As described above, the providing may include providing images, text, and other components that form the redemption header to the browser. In some embodiments, the static content such as images and text associated with the redemption header may be provided from a CDN (e.g., a CDN having a cookieless domain) and may be compressed to optimize transmission and loading time. Additionally, in some embodiments, the size and number of content associated with the redemption header may be minimized to facilitate faster transmission and loading time.

The redemption header may be then be displayed by the browser in the webpage element created for the redemption header (block 634). As discussed above, the redemption header may be displayed in the merchant webpage, such as in a header portion of the merchant webpage. If there is not a match between the requester and the expected domain (line 636), then an empty webpage element may be provided (block 624) and no redemption header is included in the merchant webpage.

As described above, after the redemption header is provided, a user may select the close control to remove the redemption header from the merchant webpage. In such embodiments, a message may be asynchronously provided to remove the redemption header (and the associated webpage element) from the merchant webpage and to remove the browser-accessible storage item. The redemption header may remain removed from the merchant webpage until the user returns to the offers webpage and selects a new offer.

In other embodiments, the merchant website may be provided in an inline frame of the offers website provided by the offers engine 12. For example, when a user selects an offer, the offers website may load another webpage having the redemption header. A merchant webpage may then be asynchronously loaded in an inline frame of the webpage, such that the redemption header 446 is still visually displayed with the merchant webpage. In such embodiments, the user may interact with the merchant website and redemption header in the manner described above. Additionally merchant webpages may be loaded in the inline frame, and the redemption header may remain on the webpage as the user navigates the merchant website.

Figure 7:
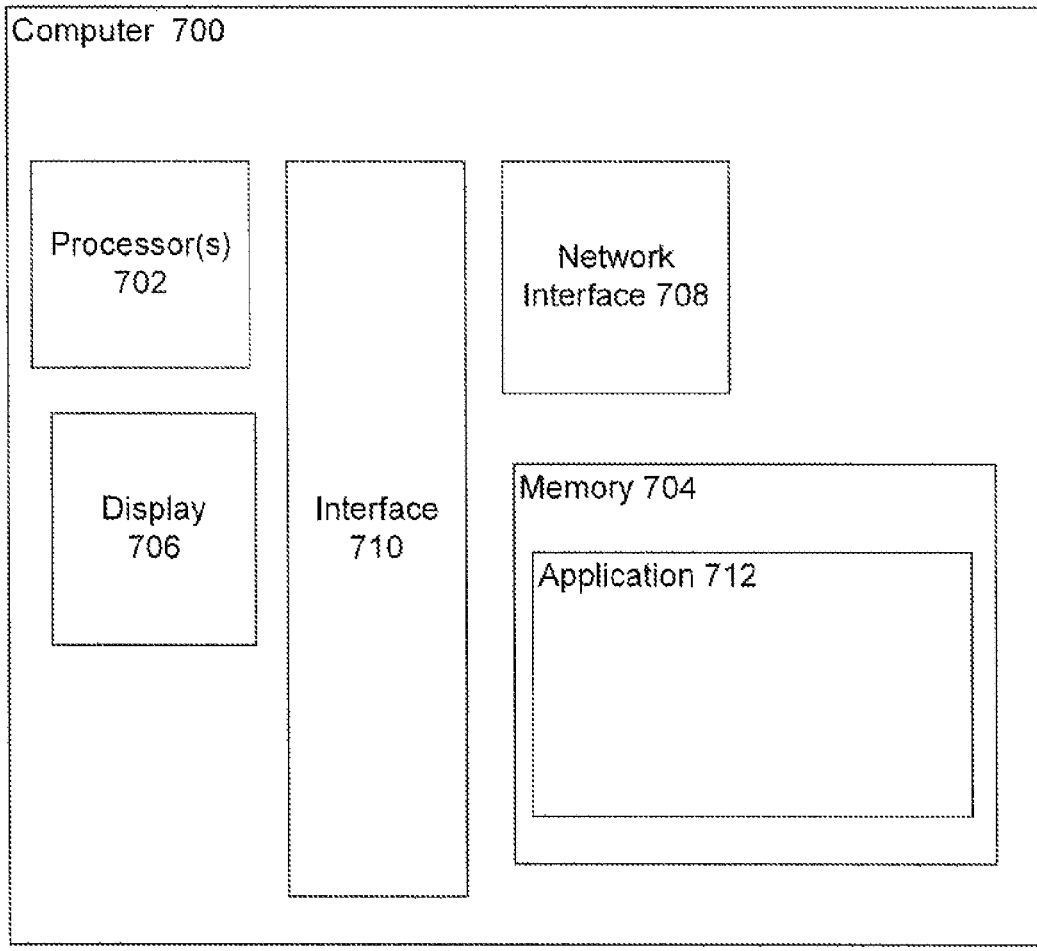
FIG. 7 is a block diagram of a computer in accordance with an embodiment of the present invention; and Although the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

FIG. 7 depicts of a computer 700 in accordance with an embodiment of the present invention. Various sections of systems and computer-implemented methods described herein, may include or be executed on one or more computers similar to computer 700. Further, processes and modules described herein may be executed by one or more processing systems similar to that of computer 700. The computer 700 may include various internal and external components that contribute to the function of the device and which may allow the computer 700 to function in accordance with the techniques discussed herein. It should further be noted that FIG. 7 depicts merely one example of a particular implementation and is intended to illustrate the types of components and functionalities that may be present in computer 700.

Computer 700 may include any combination of devices or software that may perform or otherwise provide for the performance of the techniques described herein. For example, computer 700 may include a tablet, a mobile phone, such as a smartphone, a video game device, and other hand-held networked computing devices, a desktop user device, a server, or other computing devices. Computer 700 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the computer 700 may allow a user to connect to and communicate through a network (e.g., the Internet, a local area network, a wide area network, etc.) and may provide communication over a satellite-based positioning system (e.g., GPS). For example, the computer 700 may allow a user to communicate using e-mail, text messaging, instant messaging, or using other forms of electronic communication, and may allow a user to obtain the location of the device from the satellite-based positioning system, such as the location on an interactive map.

As shown in FIG. 7, the computer 700 may include a processor 702 (e.g., one or more processors) coupled to a memory 704, a display 706, and a network interface 708 via an interface 710. It should be appreciated the computer 700 may include other components not shown in FIG. 7, such as a power source (e.g., a battery), I/O ports, expansion card interfaces, hardware buttons, etc. In some embodiments, the display 706 may include a liquid crystal display (LCD) or an organic light emitting diode (OLED) display. The display 706 may display a user interface (e.g., a graphical user interface), and may also display various function and system indicators to provide feedback to a user, such as power status, call status, memory status, etc. These indicators may be in incorporated into the user interface displayed on the display 706. In accordance with some embodiments, the display 706 may include or be provided in conjunction with touch sensitive elements through which a user may interact with the user interface. Such a touch-sensitive display may be referred to as a "touchscreen" and may also be referred to as a touch-sensitive display. In such embodiments, the display 706 may include a capacitive touchscreen, a resistive touchscreen, or any other suitable touchscreen technology.

The processor 702 may provide the processing capability required to execute the operating system, programs, user interface, and any functions of the computer 700. The processor 702 may include one or more processors that may include "general-purpose" microprocessors and special purpose microprocessors, such as one or more reduced instruction set (RISC) processors, such as those implementing the Advanced RISC Machine (ARM) instruction set. Additionally, the processor 702 may include single-core processors and multicore processors and may include graphics processors, video processors, and related chip sets. A processor may receive instructions and data from a memory (e.g., system memory 704). Processes, such as those described herein may be performed by one or more programmable processors executing computer code to perform functions by operating on input data and generating corresponding output.

The memory 704 (which may include tangible non-transitory computer readable storage mediums) may include volatile memory and non-volatile memory accessible by the processor 702 and other components of the computer 700. The memory 704 may include volatile memory, such as random access memory (RAM), and non-volatile memory, such as ROM, flash memory, a hard drive, any other suitable optical, magnetic, or solid-state storage medium, or a combination thereof. The memory 704 may store a variety of information and may be used for a variety of purposes. For example, the memory 704 may store executable code, such as the firmware for the computer 700, an operating system for the computer 700, and any other programs. The executable computer code may include instructions executable by a processor, such as processor 702, and the computer may include instructions for implementing one or more techniques described herein with regard to various processes. For example, the memory 704 may store an application 712. For example, if the computer 700 represents a user device, the application 712 may include a web browser and may enable a user to view offers, such as online coupons, and select and redeem online coupons using the user actions described above. In other embodiments, for example, the computer 700 may represent a server and the application 712 may implement some or all of the processes described above in FIGS. 5, 6A and 6B. The executable code may be written in a programming language, including compiled or interpreted languages, or declarative or procedural language, and may be composed into a unit suitable for use in a computing environment, including as a stand-alone program, a module, a component, a subroutine. Such code program may be stored in a section of a file that holds other programs or data (e.g., one or more scripts stored in a markup language document), in a single file dedicated to the program in question, or in multiple coordinated files (e.g., files that store one or more modules, sub programs, or sections of code). Additionally, the copies of the executable code may be stored in both non-volatile and volatile memories, such as in a non-volatile memory for long-term storage and a volatile memory during execution of the code.

The interface 710 may include multiple interfaces and may couple various components of the computer 700 to the processor 702 and memory 704. In some embodiments, the interface 710, the processor 702, memory 704, and one or more other components of the computer 700 may be implemented on a single chip, such as a system-on-a-chip (SOC). In other embodiments, these components, their functionalities, or both may be implemented on separate chips. The interface 710 may be configured to coordinate I/O traffic between processor 702, memory 704, network interface 706, and other internal and external components of the computer 700. The interface 710 may include functionality for interfacing via various types of peripheral buses, such as a variant of the Peripheral Component Interconnect (PCI) bus standard, the Universal Serial Bus (USB) standard, and the like.

The computer 700 depicted in FIG. 7 also includes a network interface 708, such as a wired network interface, wireless (e.g., radio frequency) receivers, etc. For example, the network interface 708 may receive and send electromagnetic signals and communicate with communications networks and other communications devices via the electromagnetic signals. The network interface 708 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The network interface 704 may communicate with networks (e.g., network XXX), such as the Internet, an intranet, a cellular telephone network, a wireless local area network (LAN), a metropolitan area network (MAN), or other devices by wireless communication. The network interface 708 may suitable any suitable communications standard, protocol and technology, including Ethernet, Global System for Mobile Communications (GSM), Enhanced Data GSM Environment (EDGE), a 4G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 702.11a, IEEE 702.11b, IEEE 702.11g or IEEE 702.11n), voice over Internet Protocol (VoIP), Wi-MAX, a protocol for email (e.g., Internet message access protocol (IMAP) or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocol.

Those skilled in the art will also appreciate that, while various items are illustrated as being stored in memory or on storage while being used, these items or sections of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-readable medium or a portable article to be read by an appropriate drive, various examples of which are described above. In some embodiments, instructions stored on a computer-readable medium separate from computer 700 may be transmitted to computer 700 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A method implemented with a server system and a user computing device, the method comprising:
    sending, by the server system, via a network, from a first domain, at least part of a first webpage to a web browser executing on the user computing device;
    displaying, by the web browser, information related to a plurality of coupons in the first webpage;
    storing, by the web browser, in client-side browser-accessible storage, identifiers of one or more of the plurality of coupons, wherein:
        the web browser implements a security policy limiting cross-domain access to browser memory by web content, and
        the web browser has an added program installed in the web browser configured to bypass the security policy and provide cross-domain access to browser memory;
    after the at least part of the first webpage is sent, coordinating, by the web browser, consistent content across domains after the web browser navigates to a second webpage from a second domain different from the first domain, wherein consistent content across domains is coordinated by:
communicating the identifiers of one or more of the plurality of coupons across domains via the client-side browser-accessible storage, from content associated with the first domain to content associated with the second domain, and accessing, with the added program installed in the web browser, the client-side browser-accessible storage after the web browser has navigated to the second webpage; and
causing the web browser to display the second webpage, concurrently with displaying information related to one or more of the plurality of coupons, in response to the identifiers of one or more of the plurality of coupons being communicated across domains, wherein browser-executable content of a redemption bar is inserted in the second webpage.

2. The method of claim 1, wherein:
sending at least part of the first webpage to the web browser executing on the user computing device comprises:
receiving, with the server system, an XMLHttpRequest request from the web browser for data, wherein the server system comprises:
an application program interface (API) server configured to provide a response to the XMLHttpRequest; and
a web server configured to provide a response to a request for a coupons interface webpage;
sending, with the server system, the information related to the plurality of coupons in the serialized format in response to the XMLHttpRequest request;
determining, with the server system, that a user of the user computing device is associated with a device independent user profile;
accessing, with the server system, the device independent user profile based on an identifier sent by the web browser; and
selecting, with the server system, one or more of the plurality of coupons based on the device independent user profile, wherein the device independent user profile comprises:
account information related to a third-party service with which the user has an account, the third-party service being configured to embed data from the coupons engine in websites;
an OAuth access token credential issued by the third-party service at the user's request; and
an expiration time of the credential;
at least some static content of the at least part of the first webpage is sent to the first web browser by a content delivery network; and
content of the redemption bar is retrieved asynchronously relative to loading of the merchant webpage.

3. The method of claim 1, further comprising:
retrieving, by the web browser, content that renders to a plurality of merchant tiles, each including a merchant logo image, and each being associated with one or more coupons;
displaying, by the web browser, the merchant tiles in a scrollable interface;
receiving, by the web browser, a user selection of one of the plurality of coupons;
after navigating to the second webpage, detecting, by the web browser, an input field in the merchant webpage with code associated with the redemption bar;
automatically populating, by the web browser, responsive to receiving a user selection of an apply-coupon button, the input field of the merchant webpage with a coupon code;
detecting, by the web browser, with the code associated with the redemption bar, loading of different webpage content in the web browser executing on the user computing device after the coupon code is submitted;
receiving, by the web browser, with the code associated with the redemption bar, feedback regarding success or failure of the coupon code; and
ranking or selecting, by the server system, coupons based on the feedback.

4. The method of claim 3, further comprising:
changing, by the web browser, the redemption bar responsive to the change in the webpage content of a checkout page.

5. The method of claim 3, wherein detecting the loading of different webpage content comprises:
parsing and analyzing data exchanged with the merchant domain.

6. The method of claim 1, wherein inserting comprises:
causing, by the web browser, at least some information stored in client-side browser-accessible storage related to the coupons to be displayed in the redemption bar.

7. The method of claim 1, wherein:
sending the at least part of the first webpage comprises sending information related to the plurality of coupons from a coupons engine of the server system; and
the coupons engine comprises an in-random-access-memory cache server storing in key-value pairs in random-access-memory a collection of information related to coupons including the information related to the plurality of coupons.

8. The method of claim 7, wherein:
the coupons engine comprises a data store storing the collection of information related to coupons;
the cache server mirrors the collection of information related to coupons from the data store; and
the cache server is configured to facilitate faster access to information related to coupons than access provided by the data store.

9. The method of claim 8, wherein:
a subset of information related to coupons in the data store is selected to be stored in the collection of information related to coupons stored by the cache server; and
one or more of the plurality of coupons are retrieved by the cache server by determining a hash key value based on a parameter of a request, the hash key being paired with an address of the at least one of the plurality of coupons.

10. The method of claim 7, further comprising:
ingesting, with the coupons engine, a data feed having coupons in a serialized format; and
concurrently analyzing the plurality of coupons of the data feed by mapping the ingested coupons to a plurality of processes operating in parallel.

11. A tangible, non-transitory, machine-readable medium storing instructions that when executed by one or more processors effectuate operations comprising:
sending, by a server system, via a network, from a first domain, at least part of a first webpage to a web browser executing on a user computing device;
displaying, by the web browser, information related to a plurality of coupons in the first webpage;

storing, by the web browser, in client-side browser-accessible storage, identifiers of one or more of the plurality of coupons, wherein:
the web browser implements a security policy limiting cross-domain access to browser memory by web content, and
the web browser has an added program installed in the web browser configured to bypass the security policy and provide cross-domain access to browser memory;
after the at least part of the first webpage is sent, coordinating, by the web browser, consistent content across domains after the web browser navigates to a second webpage from a second domain different from the first domain, wherein consistent content across domains is coordinated by:
communicating the identifiers of one or more of the plurality of coupons across domains via the client-side browser-accessible storage, from content associated with the first domain to content associated with the second domain, and accessing, with the added program installed in the web browser, the client-side browser-accessible storage after the web browser has navigated to the second webpage; and
causing the web browser to display the second webpage, concurrently with displaying information related to one or more of the plurality of coupons, in response to the identifiers of one or more of the plurality of coupons being communicated across domains, wherein browser-executable content of a redemption bar is inserted in the second webpage.

12. The medium of claim 11, wherein:
sending at least part of the first webpage to the web browser executing on the user computing device comprises:
receiving, with the server system, an XMLHttpRequest request from the web browser for data, wherein the server system comprises:
an application program interface (API) server configured to provide a response to the XMLHttpRequest; and
a web server configured to provide a response to a request for a coupons interface webpage;
sending, with the server system, the information related to the plurality of coupons in the serialized format in response to the XMLHttpRequest request;
determining, with the server system, that a user of the user computing device is associated with a device independent user profile;
accessing, with the server system, the device independent user profile based on an identifier sent by the web browser; and
selecting, with the server system, one or more of the plurality of coupons based on the device independent user profile, wherein the device independent user profile comprises:
account information related to a third-party service with which the user has an account, the third-party service being configured to embed data from the coupons engine in websites;
an OAuth access token credential issued by the third-party service at the user's request; and
an expiration time of the credential;
at least some static content of the at least part of the first webpage is sent to the first web browser by a content delivery network; and
content of the redemption bar is retrieved asynchronously relative to loading of the merchant webpage.

13. The medium of claim 11, the operations further comprising:
retrieving, by the web browser, content that renders to a plurality of merchant tiles, each including a merchant logo image, and each being associated with one or more coupons;
displaying, by the web browser, the merchant tiles in a scrollable interface;
receiving, by the web browser, a user selection of one of the plurality of coupons;
after navigating to the second webpage, detecting, by the web browser, an input field in the merchant webpage with code associated with the redemption bar;
automatically populating, by the web browser, responsive to receiving a user selection of an apply-coupon button, the input field of the merchant webpage with a coupon code;
detecting, by the web browser, with the code associated with the redemption bar, loading of different webpage content in the web browser executing on the user computing device after the coupon code is submitted;
receiving, by the web browser, with the code associated with the redemption bar, feedback regarding success or failure of the coupon code; and
ranking or selecting, by the server system, coupons based on the feedback.

14. The medium of claim 13, the operations further comprising:
changing, by the web browser, the redemption bar responsive to the change in the webpage content of a checkout page.

15. The medium of claim 13, wherein detecting the loading of different webpage content comprises:
parsing and analyzing data exchanged with the merchant domain.

16. The medium of claim 11, wherein inserting comprises:
causing, by the web browser, at least some information stored in client-side browser-accessible storage related to the coupons to be displayed in the redemption bar.

17. The medium of claim 11, wherein:
sending the at least part of the first webpage comprises sending information related to the plurality of coupons from a coupons engine of the server system; and
the coupons engine comprises an in-random-access-memory cache server storing in key-value pairs in random-access-memory a collection of information related to coupons including the information related to the plurality of coupons.

18. The medium of claim 17, wherein:
the coupons engine comprises a data store storing the collection of information related to coupons;
the cache server mirrors the collection of information related to coupons from the data store; and
the cache server is configured to facilitate faster access to information related to coupons than access provided by the data store.

19. The medium of claim 18, wherein:
a subset of information related to coupons in the data store is selected to be stored in the collection of information related to coupons stored by the cache server; and
one or more of the plurality of coupons are retrieved by the cache server by determining a hash key value based on a parameter of a request, the hash key being paired with an address of the at least one of the plurality of coupons.

20. The medium of claim 17, the operations further comprising:
  ingesting, with the coupons engine, a data feed having coupons in a serialized format; and
  concurrently analyzing the plurality of coupons of the data feed by mapping the ingested coupons to a plurality of processes operating in parallel.

* * * * *